United States Patent [19]

Ishimoto et al.

[11] Patent Number: 5,692,229
[45] Date of Patent: Nov. 25, 1997

[54] IMAGE FORMING SYSTEM WHICH SUPERIMPOSES ADDITIONAL INFORMATION ON AN IMAGE SIGNAL

[75] Inventors: Koichi Ishimoto, Yokohama; Mitsuru Kurita, Tokyo; Toshiyuki Kitamura, Yokohama, all of Japan

[73] Assignee: Canon Kabushiki Kaisha, Tokyo, Japan

[21] Appl. No.: 252,163

[22] Filed: May 31, 1994

[30] Foreign Application Priority Data

May 31, 1993 [JP] Japan ................................. 5-129697
Jul. 22, 1993 [JP] Japan ................................. 5-181188

[51] Int. Cl.⁶ ............................. G03G 15/00; H04N 1/00
[52] U.S. Cl. ............................. 399/2; 358/401; 358/448
[58] Field of Search ............................. 355/204, 200, 355/326 R; 358/300, 448, 402, 400, 403, 404, 450; 347/225; 399/2, 6, 182, 194, 144

[56] References Cited

U.S. PATENT DOCUMENTS

| | | |
|---|---|---|
| 4,476,486 | 10/1984 | Ayata et al. ................ 358/501 |
| 4,564,864 | 1/1986 | Maeshima et al. ............ 358/444 |
| 4,791,492 | 12/1988 | Nagashima et al. ........... 358/409 |
| 4,797,706 | 1/1989 | Sugishima et al. ........... 355/200 X |
| 4,866,532 | 9/1989 | Ayata et al. ................ 358/443 |
| 5,021,876 | 6/1991 | Kurita et al. ............... 358/530 |
| 5,040,031 | 8/1991 | Hayashi .................... 355/326 R |
| 5,079,625 | 1/1992 | Kitamura et al. ............ 358/537 |
| 5,165,072 | 11/1992 | Kurita et al. ............... 358/448 |
| 5,187,593 | 2/1993 | Kurita et al. ............... 358/434 |
| 5,339,168 | 8/1994 | Evanitsky et al. ........... 355/204 X |

*Primary Examiner*—S. Lee
*Attorney, Agent, or Firm*—Fitzpatrick, Cella, Harper & Scinto

[57] ABSTRACT

An image forming system includes a plurality of interconnected image forming devices each of which has a storage unit which stores an image signal. The system has an image input unit for entering an image signal, and an image processing unit which processes the image signal entered by the image input unit. A transfer unit simultaneously transfers the image signal, which has been processed by the image processing unit, to the plurality of image forming devices.

32 Claims, 30 Drawing Sheets

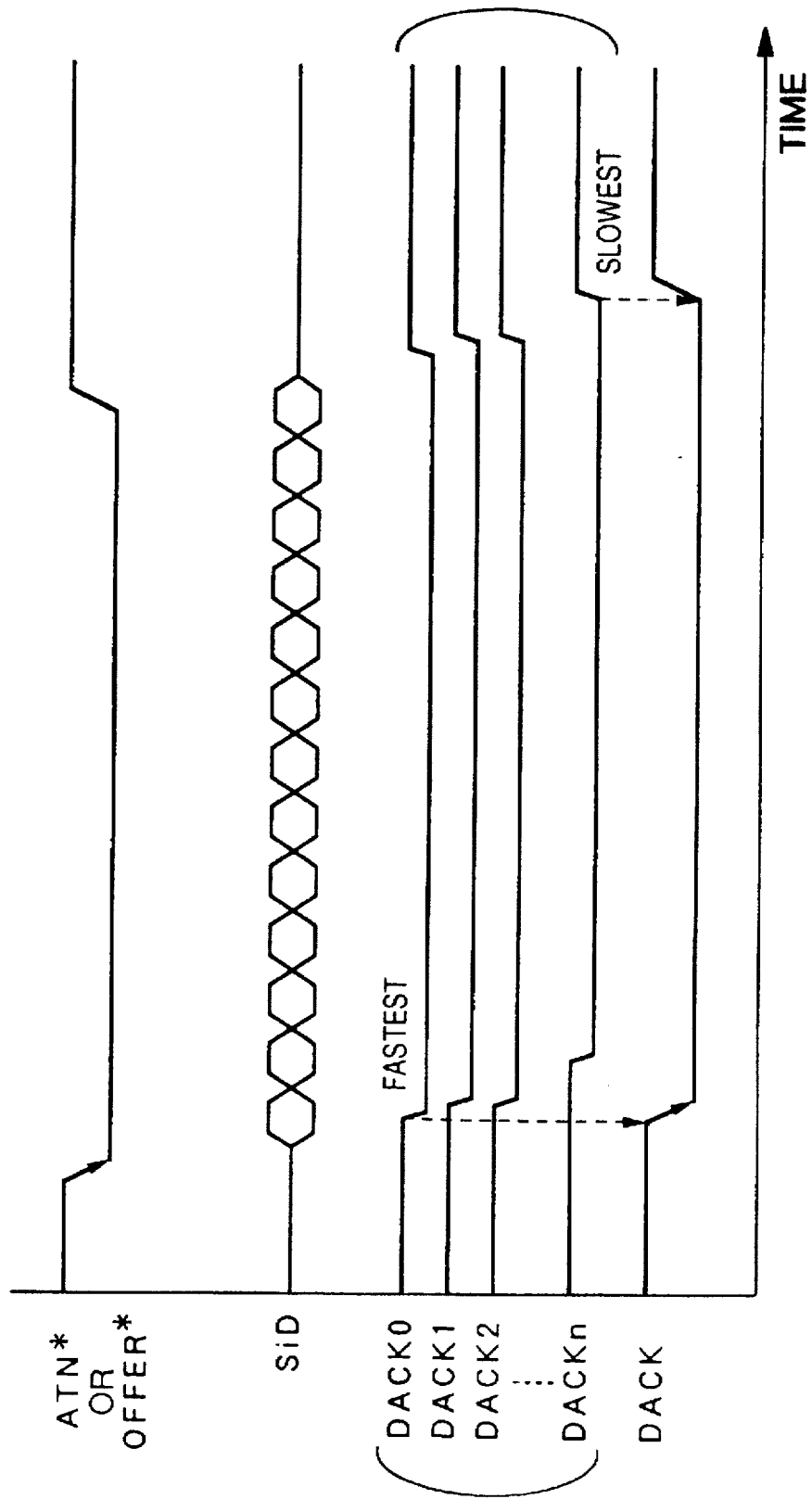

FIG. 5

| CODE | COMMAND | CONTENTS |
|---|---|---|
| 10 | INTERFACE CLEAR | ISSUED BY MASTER STATION AFTER IT HAS BEEN INITIALIZED AT POWER TURN-ON |
| 01 | PRINT START | ISSUED BY SOURCE OF IMAGE TRANSFER. CONTAINS ADDRESS OF START-REQUEST SOURCE, ADDRESS OF START-REQUEST DESTINATION, PAPER SELECTION, NUMBER OF SHEETS, ETC. |
| 03 | STATUS REQUEST | ISSUED BY MASTER AT FIXED INTERVALS. CONTAINS ADDRESS OF REQUEST SOURCE |
| 05 | STAUS TRANSFER | ISSUED BY SLAVE WITHIN FIXED PERIOD OF TIME IN RESPONSE TO STATUS REQUEST FROM MASTER. CONTAINS OWN ADDRESS FOLLOWED BY PRINTER STATUS, ABSENCE OR PRESENCE OF ERROR, ETC. |
| 06 | END OF IMAGE TRANSFER | ISSUED BY SOURCE OF IMAGE TRANSFER AFTER END OF IMAGE TRANSFER |

IMAGE FORMING SYSTEM WHICH SUPERIMPOSES ADDITIONAL INFORMATION ON AN IMAGE SIGNAL

BACKGROUND OF THE INVENTION

This invention relates to an image forming system in which a plurality of image forming units are interconnected for forming images simultaneously.

A reader and a printer constituting a digital copier are capable of being utilized independently as an image reading device and an image output device, respectively. Accordingly, systems have been proposed in which the reader/printer is connected to an ordinary computer system using an external I/F interface so as to be utilized as an image input/output unit, or in which a plurality of sets of reader/printers are distributed and connected and a central control means for controlling them is provided to allow a high copy volume (CV) by using a plurality of printers simultaneously.

Further, with the recent improvements that have been made in the capabilities of color copiers and color printers, there is a greater possibility that these devices will be utilized unlawfully, as in counterfeiting. However, it has heretofore been impossible to specify, based upon the copy produced, the particular device used to make the copy or the individual who produced the copy. In order to prevent such unlawful copying, consideration has been given to registering data indicative of image patterns of specific originals in a color copier or color printer per se and forcibly inhibiting unlawful copying when the data is identified by an image recognition circuit.

However, the circuitry that discriminates specific originals is such that the number of image patterns capable of being registered is limited. This is disadvantageous in that it is impossible to register all types of specific originals. In addition, there are cases in which the circuitry for discriminating specific originals will not function in a color copier or color printer having an external interface.

For example, if the specifications of the image data in the external interface are such that data of the three primary colors red, green and blue are sent to the device simultaneously, the above-mentioned discriminating circuit will be capable of operating. However, if the data specifications have been made to conform to the individual characteristics of a printer, as in the case of data in the colors cyan, magenta, yellow and black, there will be a plurality of combinations capable of color reproduction. Consequently, a plurality of image patterns for discrimination are required and discrimination for detecting specific originals is very complicated. An additional drawback is a smaller number of images capable of being discriminated.

Furthermore, in a case where image data of each of the color components is sent to the device field-sequentially color by color, the image data must be accumulated in memory in order to discriminate an image. This leads to higher cost and necessitates a large expenditure for discriminating the specific images.

Even if the problem of the image signal from the external interface is solved and image recognition is performed by limiting the number of specific originals to the number capable of being recognized, erroneous recognition in which a picture quite similar to a registered specific original is discriminated as being the specific original or in which a soiled specific original is not discriminated as being the specific original cannot be avoided.

Accordingly, though it is important that the image forming device be provided with means for detecting specific originals, there is a limitation upon the number of specific originals that can be detected. Therefore, in a case where an original that is not supposed to be copied has been copied, specifying the copying machine or the individual that produced the copy is important.

With this as a background, a technique has been studied through which information capable of specifying the copying device or individual can be added on to a specific original. Specifically, this technique involves using an output color component (yellow, for example) that is least conspicuous to the human eye from among the output color components (magenta, cyan, yellow, black) of a copier, modulating the image signal of this color component (as by adding a constant value) and adding on a pattern representing the manufacturing serial number of the copying device.

Demand is great for the ability to output not only a reflective original but also images of a wide variety of kinds [e.g., computer graphics (CG)]. Such a function is essential in modern digital copiers.

However, when system development in such a digital copier is considered, there is no correlation between the reader/printer actually used in copying and added-on information since the added-on information is not set appropriately. Such a copier makes it very difficult to specify, based upon the reproduced image, the copier that copied the image or the individual who performed the copying operation.

Further, when system development in such a digital copier is considered, one subject that arises is construction of a system in which high CV can be achieved by using a plurality of output devices simultaneously.

In a technique in which a plurality of reader/printer sets are connected and a central control unit is employed to control them, the number of sets of reader/printers capable of being connected must be determined when the constitution of the central control unit is considered. Limitations are encountered in terms of flexible system expansion according to need.

SUMMARY OF THE INVENTION

Accordingly, an object of the present invention is to provide an image forming system and apparatus for obtaining high-speed image output by using a plurality of outputs.

Another object of the present invention is to provide an image forming system and apparatus in which it is possible to correctly specify, from a reproduced image, an image forming device constituting a system that outputted the reproduced image.

Further, according to the present invention, the foregoing object is attained by providing an image forming system in which a plurality of image forming devices are interconnected and capable of transferring image signals to one another, each image forming device having image input means for entering an image signal, storage means for storing an image signal entered by the image input means, image forming means for forming an image on an output medium based upon the image signal stored in the storage means, and image-signal/image-control-signal changeover means capable of outputting, to an external unit, a control signal that controls the storage means as well as the image signal, and capable of inputting the image signal and the control signal from an external unit, at least one of the plurality of image forming devices constituting the system having memory connecting means for connecting an image input unit, wherein data is capable of being transferred simultaneously from the image memory unit connected by the memory connecting means to the storage means of the plurality of image forming devices connected to the system.

Further, the foregoing object is attained by providing an image forming system in which a plurality of image forming devices are interconnected and capable of forming images simultaneously, each image forming device having image input means for entering an image signal, image processing means for processing the image signal entered by the image input means, and additional-information superimposing means for superimposing additional information on the image signal image-processed by the image processing means, an output image being obtained upon delivering an output from the additional-information superimposing means to a plurality of image forming units, the system being capable of adding on additional information, which differs for each individual image forming device, to output images obtained from the plurality of image forming devices constituting the system, or additional information of an identical form to output images obtained from the plurality of image forming devices constituting the system.

Further, according to the present invention, the foregoing object is attained by providing an image forming system in which a plurality of image forming devices are interconnected and capable of transferring image signals to one another, each image forming device having image input means for entering an image signal, storage means for storing an image signal entered by the image input means, image forming means for forming an image on an output medium based upon the image signal stored in the storage means, and image-signal/image-control-signal changeover means capable of outputting, to an external unit, a control signal that controls the storage means as well as the image signal, and capable of inputting the image signal and the control signal from an external unit, at least one of the plurality of image forming devices constituting the system having memory connecting means for connecting an image input unit, wherein writing of image data from the image memory unit connected by the memory connecting means to the storage means of the plurality image forming devices is performed in accordance with a main-scan synchronizing signal and a sub-scan synchronizing signal of an image, and main-scan synchronizing signals of the plurality of image forming devices are signals generated by respective ones of these devices.

Further, according to the present invention, the foregoing object is attained by providing an image forming system in which a plurality of image forming devices are interconnected and capable of transferring image signals to one another, each image forming device having image input means for entering an image signal, storage means for storing an image signal entered by the image input means, image forming means for forming an image on an output medium based upon the image signal stored in the storage means, and image-signal/image-control-signal changeover means capable of outputting, to an external unit, a control signal that controls the storage means as well as the image signal, and capable of inputting the image signal and the control signal from an external unit, wherein a digital image signal read by reading means of an image forming device, which has been selected from among the plurality of image forming devices connected to the system, and converted by an image converting means is capable of being transferred to and written in the storage means of the plurality of image forming devices.

In the arrangement described above, an image forming device constituting a system that has outputted a reproduced image can be specified correctly based upon the reproduced image by setting additional information appropriately. Further, when an output is made from an image memory unit, each image forming device is capable of reading in the output simultaneously.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a timing chart illustrating timing at the time of a data transmission in serial communication in a concatenated system according to this embodiment;

FIG. 5 is a diagram showing the main commands used in serial communication in a concatenated system according to this embodiment;

DESCRIPTION OF THE PREFERRED EMBODIMENTS

Embodiments of the present invention will now be described in detail with reference to the drawings.

Recent improvements in the speed-up of digital copiers have been accompanied by the appearance of digital copiers equipped with a full-page memory for storing image data that has been read internally by the copier. In digital copiers of this kind, the arrangement is such that the read image is stored in the page memory temporarily and then read out when the image is to be outputted. For this reason the timing of the image reading operation and image readout operation is more flexible in comparison with the copiers of conventional construction.

In a digital copier of this kind, a control signal for writing image data in the page memory is capable of being accepted from outside the copier as well, and changeover means is provided for changing over between the image signal and the external control signal. Thus, the copier is capable of storing an image signal generated by another copier, besides an image signal which it generates itself, in the page memory. This makes it possible to construct a flexible, extendible system (hereinafter referred to as a "concatenated system") in which the number of system components can be changed to conform to the necessary CV.

However, a problem which arises in this concatenated system is how to determine the kind of additional information to be added on when an image signal from the image reader of one image forming device or from an external storage device is transferred to a plurality of image forming units in order be printed out. According to the following embodiments, which have been devised in view of this problem, it is so arranged that by appropriately setting additional information in a concatenated system, a reader or printer in the system that has copied an image can be specified correctly from the reproduced image.

<First Embodiment>

Figure 1:
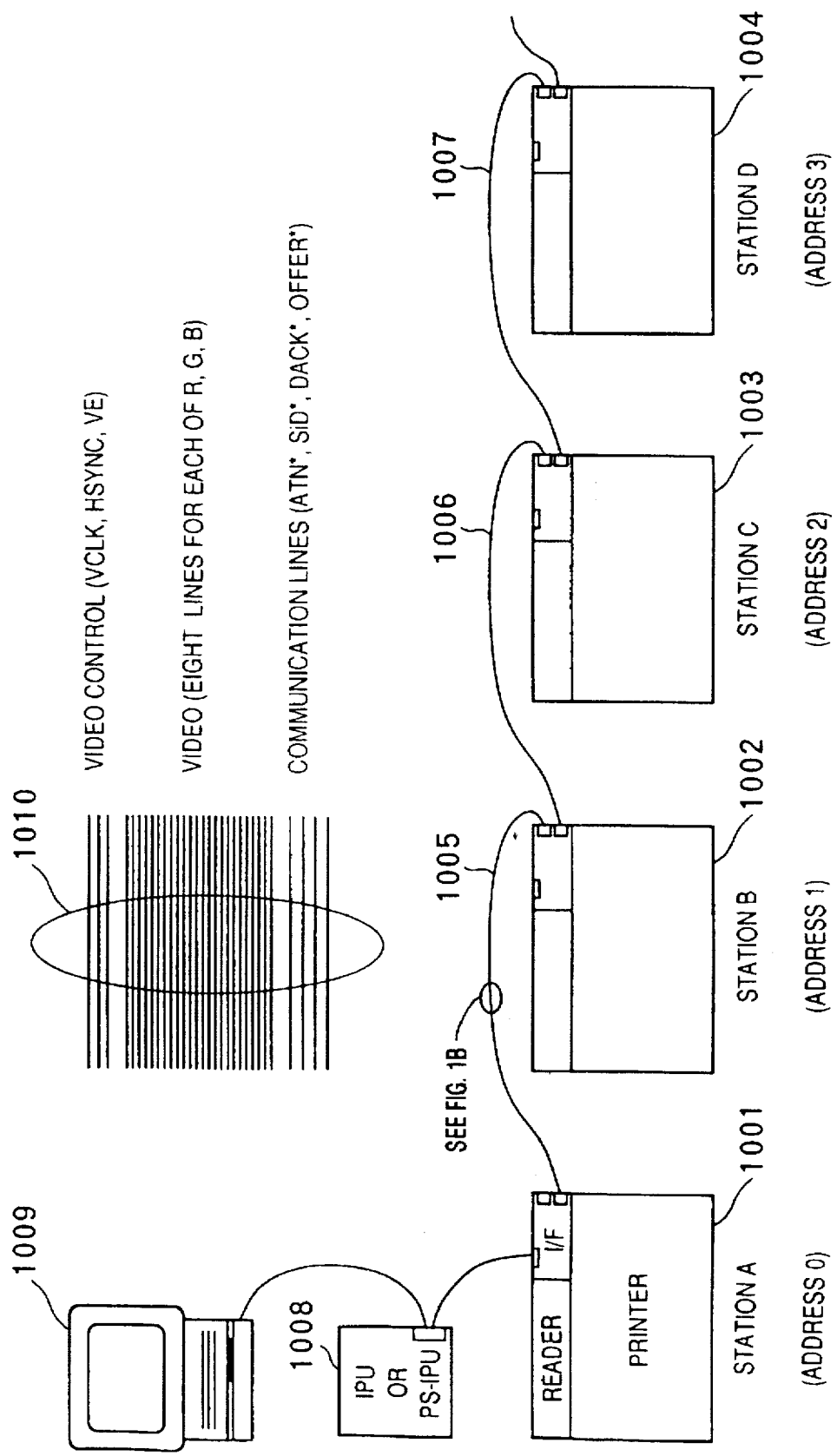
FIG. 1 is a conceptual view showing the connected configuration of a tandem system according to the present invention.

FIG. 1 illustrates the system configuration of an embodiment of the present invention, in which an image forming device is constituted by a digital copier.

As shown in FIG. 1, numerals 1001~1004 denote digital copiers all of which are composed of a single set (this set shall be referred to as "one station" hereinafter). Each station has its own system address. The system addresses of the stations connected to this concatenated system are all different, and it is required that there always be a "0" address. The order in which the system addresses are connected is determined in order to change over video signals.

In this embodiment, the station of address 0 is placed at one extremity of the system, and the other system addresses are connected in ascending order starting from this position. Cables 1005~1007 are for connecting these stations to the concatenated system and, as shown at numeral 1010, each includes a total of 24 video signal lines, or eight for each of the colors R, G, B, three video control lines and four serial communication lines. An interface device 1008 is for connecting these digital copiers to an ordinary computer 1009.

Figure 2:
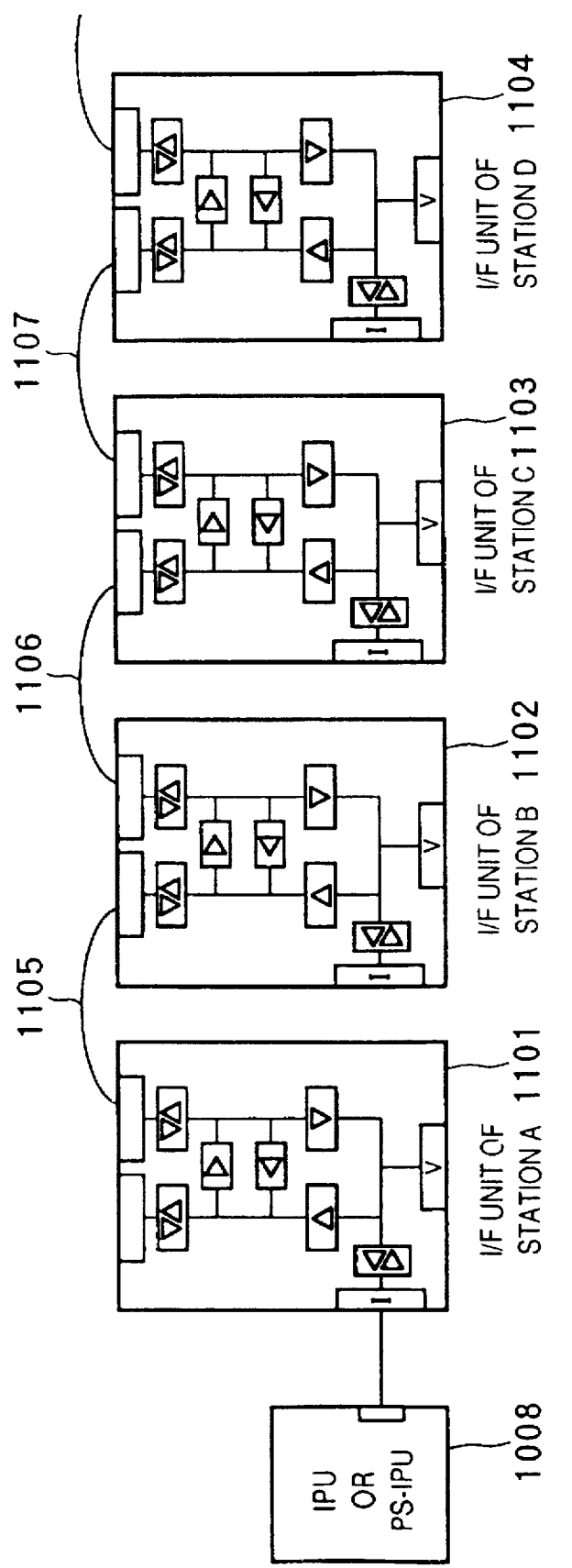
FIG. 2 is a conceptual view showing the connected configuration of video-signal related portions in the concatenated system of FIG. 1.

FIG. 2 illustrates the manner in which video signals are connected in the system constructed as set forth above.

In FIG. 2, only interfaces (I/Fs) 1101~1104 in the respective stations shown in FIG. 1 are illustrated.

In this embodiment, the relationship between system addresses and contacts (each I/F has a contact 1 and a contact 2) with other stations is such that a station having a lower address than that of a given station is connected to the contact 1 of the given station, while a station having an address higher than that of the given station is connected to the contact 2 of the given station. If this relationship is observed, no particular inconvenience will occur even if the system addresses are not always continuous.

Figure 3:
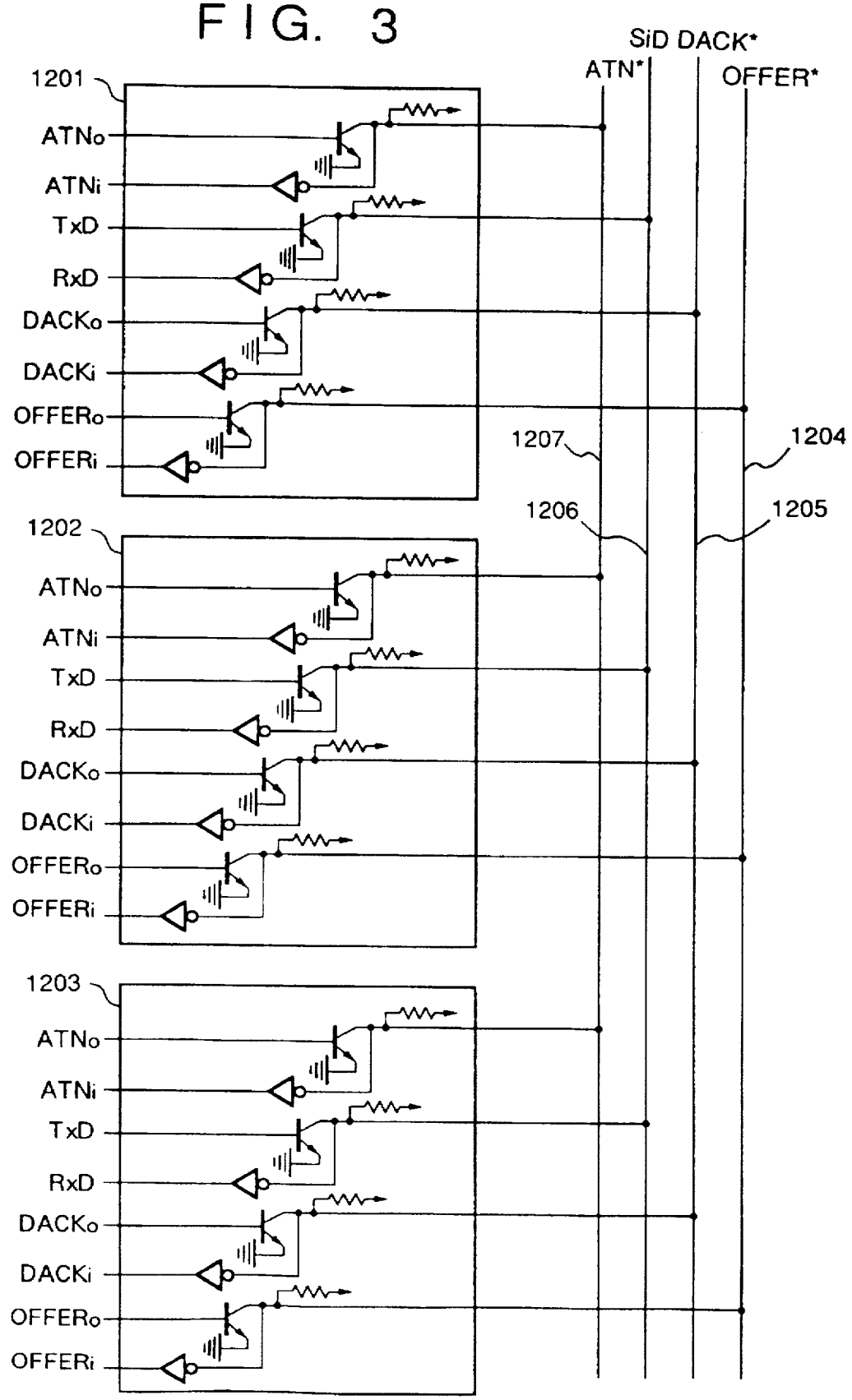
FIG. 3 is a conceptual view showing the connected configuration of a serial communication-line portion in the concatenated system of FIG. 1.

FIG. 3 illustrates the detailed connections of the cables 1005~1007 (serial communication lines) in each of the I/Fs illustrated in FIG. 2 of the system.

In FIG. 3, numerals 1201~1203 denote what is obtained by extracting only the interfaces 1101~1103 contained in the respective stations 1001~1003 depicted in FIG. 2. There are four signal lines for serial communication, namely lines ATN* (1207), SiD* (1206), DACK* (1205) and OFFER* (1204).

ATN* is a synchronizing signal indicating that a data transfer from a master station (defined as the station at system address 0) in the concatenated system is in progress. A data transfer is carried out when ATN*=1 (low level) holds. At stations other than the master station (these stations shall be referred to as "slave stations" hereinafter), the line of ATN* is always an input.

As for OFFER*, OFFER*=1 (low level) holds when a slave station transmits data to the master station. This is always an input at the master station. A plurality of slave stations are connected in the form of a wired OR. DACK* is a signal indicating that data reception has been completed on the data-receiving side. Stations are interconnected in the form of a wired OR. Accordingly, in a case where a plurality of stations are receiving sides, the station that is slowest in completing the data reception renders DACK* inactive, at which time DACK* on the line becomes inactive. As a result, exchange of data between stations is synchronized.

SiD* is bidirectional serial data. Data is exchanged in synchronism with ATN* (master→slave) and OFFER* (slave→master). The method of data transfer is half-duplex start-stop synchronization. The transfer speed and data format are set beforehand at system start-up.

Each of the interfaces 1201~1203 has eight signal lines connected as output lines to controllers of respective stations. Lines TxD and RxD are connected respectively to transmit/receive serial communication; ATNo, DACKo, OFFERo are connected to I/O ports for input; and ATNi, DACKi, OFFERi are connected to I/O ports for output. FIG. 4 is a timing chart of each of the signals at the time of data transmission in the embodiment described above.

When the concatenated system shown in FIG. 1 has been constructed using the interfaces of the embodiment constructed as set forth above, communication is carried out via the aforementioned cables 1005~1007, which are serial signal lines. The main commands used at this time are shown in FIG. 5.

In FIG. 5, an interface-clear command having a code 10 is a command that resets parameters associated with the concatenated system. The master station defined to have the system address 0 issues this command after it itself has been initialized. The master station fixes OFFER* at the input. Each slave station receives this command, fixes ATN* at the input and initializes internal parameters.

A status-request command having a code 03 is a polling command for acquisition of information such as the status of the slaves connected to the concatenated system. After the master station has issued the interface-clear command, the master station issues the status-request command to each slave at fixed times. This command includes a request-destination address as a parameter for designating a slave.

A status-transfer command having a code 05 is a command which the slave designated by the above-mentioned status-request command issues to each station in the concatenated system to inform each station of its own (the designated slave) status. In a case where a slave has been designated by the master station, the slave must issue this command within a fixed period of time. This command includes various flags representing the system address of the particular slave, the absence or presence of an error, whether the slave is waiting or whether copying is in progress, and parameters indicating the type of recording paper, whether paper is available or has run out, etc. In a case where a slave designated by a status-request command from the master station fails to issue a status-transfer command upon elapse of the fixed time period, the master station renders a decision to the effect that the designated slave station is not connected to the concatenated system.

A print-start command having a code 01 is a command which designates whether a station transferring an image uses another station (as well as which other station), as well as how a number of sheets are to be distributed to each station used, whereby each station used is made to prepare for reception of an image. This command includes parameters such as the address of the source of the image transfer, a request-destination address, paper size and number of sheets.

An image transfer-end command having a code 06 is issued by the station which is the source of image transfer and is for informing other stations of the fact that image transmission has ended.

A procedure will now be described in which the image of an original placed on the platen of a reader of a specific station is outputted from a plurality of printers of other stations using the concatenated system of this embodiment constructed as set forth above.

In the description that follows, it is assumed that four stations A, B, C, D shown in FIG. 1 are connected to the concatenated system and that an original has been placed on the platen of the reader at station A 1001.

The reader control panel at station A 1001 is operated to verify that the stations B, C, D (1002~1004) are operating normally and can be used. Thereafter, a setting is made so that an output is obtained using all of the stations A, B, C, D (1001~1004), and the number of copies is set as well. When a copy starting key at station A 1001 is pressed, this station distributes the set copy number to each of the stations and sends the print-start command to all stations.

Upon receiving the print-start command, the stations B, C, D (1002~1004) set such parameters as the number of copies and paper size sent together with this command, performs a video-signal changeover based upon the system address of the source of the command and their own system addresses, change over control for writing image data in their own image memories to VIDEO control lines (VCLK, HSYNC,VE) of the I/Fs and make a transition to a state in which they await an image signal.

Meanwhile, the station A 1001 performs a setting for reading the image, effects a changeover in such a manner that a control signal for writing image data in its own image memory emerges on the VIDEO control lines in the I/Fs and starts the image reading operation. The stations B, C, D (1002~1004) write image data in their image memories using the control signal obtained from the station A 1001. When the image reading operation at station A 1001 is completed, the image transfer-end command is issued by the station A 1001, and the station A 1001 and stations B, C, D (1002~1004) each undergo a transition to a printout operation.

An original may similarly be placed on the reader platen of any of the stations A, B, C, D. Regardless of the station, outputs utilizing a plurality of the stations can be obtained through the same procedure by operating the control panel of the station having the original.

Next, a procedure will be described for obtaining, using a plurality of stations, an output from a host computer connected, via an external I/F device such as an IPU, to one station connected to the concatenated system.

The states of all stations connected to the concatenated system are aggregated in the host computer 1009 via the external I/F device 1008 (hereinafter referred to as an "IPU"). The host computer 1009 is operated to set the stations used, the number of copies and the paper, etc., in conformity with the status of the concatenated system, and to transfer an output image to the IPU. The latter notifies the connected station (station A1001 in the present case) of these settings.

Upon receiving this notification, the station A 1001 issues the print-start command to the other stations used. In response to reception of the print-start command, these stations stand by for an image signal through a procedure similar to that for the above-described case in which an output of an original on a platen is obtained. The station 1001 to which the IPU is connected changes over the video signal to a mode for "input from IPU" and "output to other stations" and then issues a command so as to send an image to the IPU.

VIDEO control signals used in reading the image out of the IPU and in writing the image in the remaining stations are all generated by the station A 1001 to which the IPU is connected, and these signals are used to control the overall system. Accordingly, the image data read out of the IPU is written in the image memory of the station A 1001 and, at the same time, is written simultaneously in the image memories of the other stations. The station A 1001 issues the image transfer-end command after the image writing operation, whereby each station starts performing printout.

In any of the cases described above, the print-start command is also sent to any station not selected at the time of the operation for selecting the stations used. In this case, an expedient deemed effective is to judge that a station has not been selected if it accepts a print-start command containing a number of copies of zero. By adopting this expedient, the I/F unit is changed over even in an unselected station to make it possible for an image signal to be delivered to the target station. Since the print-start command contains the address of the source of the start request, the station may compare this with its own address, thereby judging how the I/F should be changed over.

When copying is being performed locally (meaning not in combination with other stations) at one station connected to the concatenated system, an interrupt based upon serial communication in the concatenated system is masked. It is so arranged that in a case where this station is the master station, it issues its own status-transfer command and a status-request command, which is directed to each slave station, at fixed time intervals. If this station is a slave station, the station issues only its own status-transfer request at a fixed time interval. As a result, the occurrence of unnecessary interrupt processing during copying is prevented and it is possible for a station to inform other stations of its own status. When local copying ends, interrupt processing based upon serial communication in the concatenated system is allowed again and processing is restored for issuing a status-transfer command in response to a status-request command issued by the master station.

In the embodiment described above, a printer used when printing out an output image can be specified from the additional information of the output image.

Figure 6:
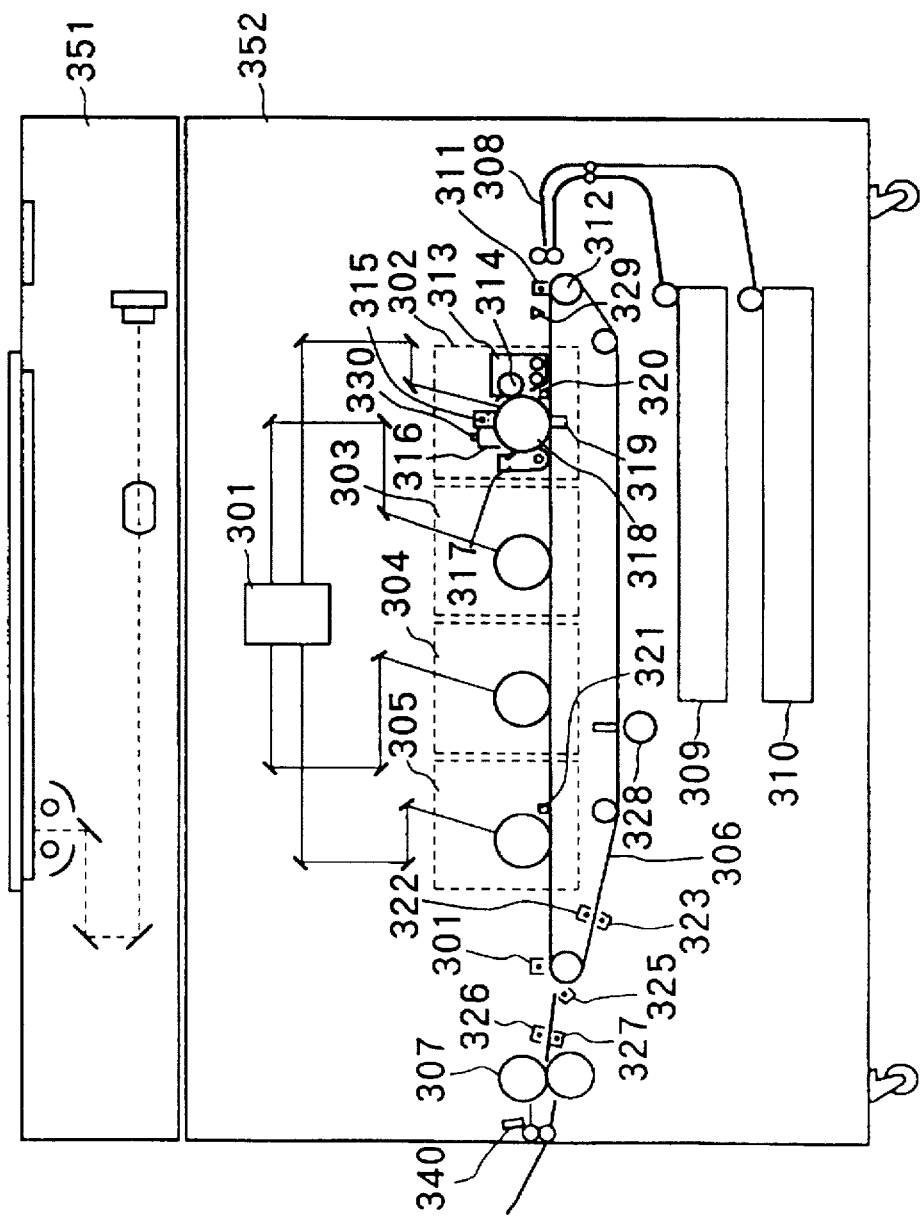
FIG. 6 is a diagram showing the construction of an image forming device at each station in this embodiment.

FIG. 6 is an external view of one of the identical stations 1001–1004. The station shown in FIG. 6 is constituted by a reader 351 for reading a color original and executing digital editing processing, and a printer 352, having different image carriers, for reproducing a color image in conformity with a digital signal of each color sent from the reader 351.

(Construction of reader 351)

Figure 7:
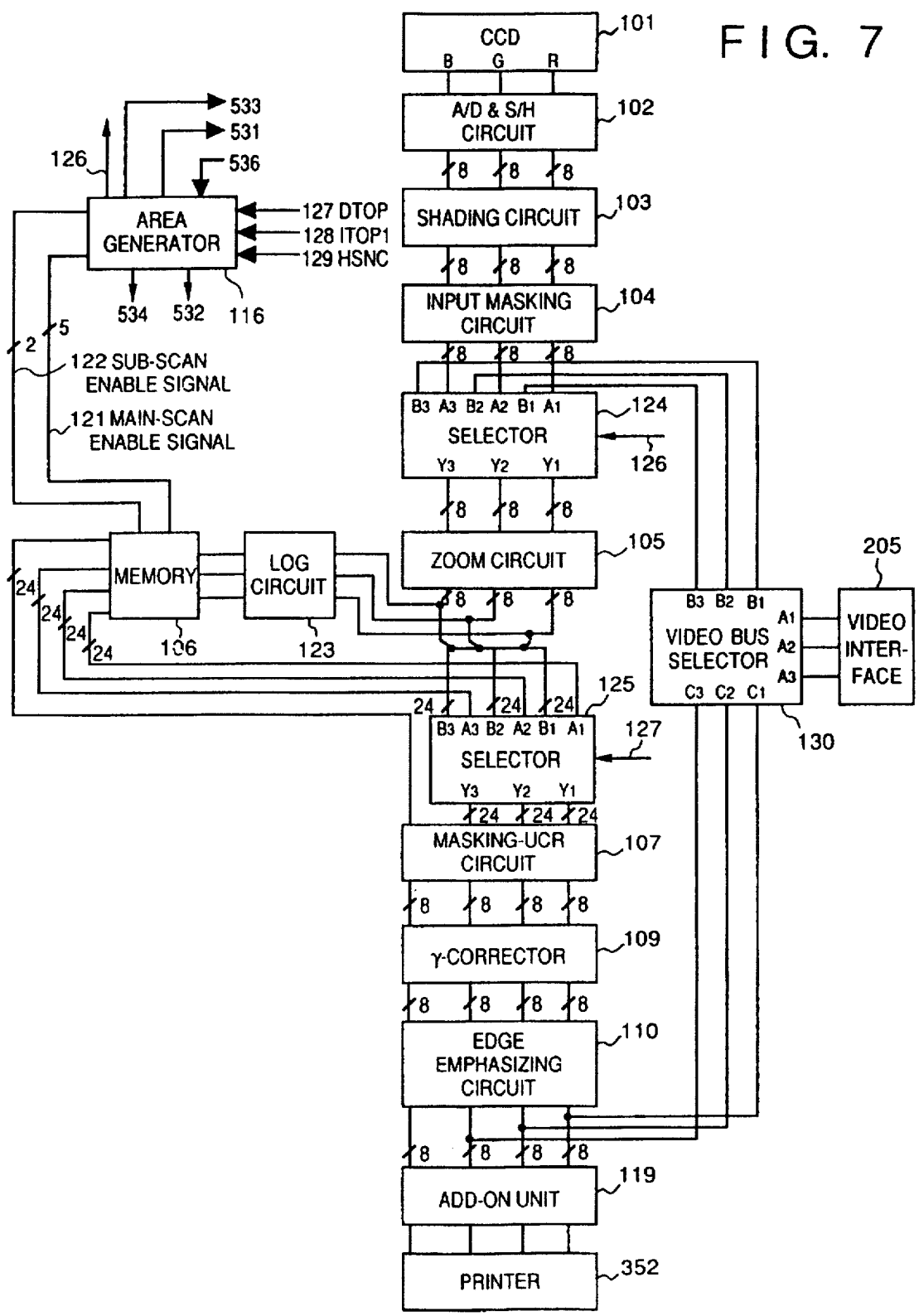
FIG. 7 is a block diagram showing a digital image processing section of a reader in the image forming device depicted in FIG. 6.

FIG. 7 is a block diagram illustrating the digital processing section of the reader 351. A color image on a platen (not shown) is exposed by a halogen lamp (not shown). As a result, the reflected image is sensed by a CCD 101, sampled and held and then converted to a digital signal by an A/D & S/H circuit 102, whereby digital signals in each of the three colors R, G, B are produced.

This data separated by color is subjected to shading and is black-corrected by a shading circuit 103, after which the resulting data is corrected to an NTSC signal by an input masking circuit 104. The output of the circuit 104 is sent to a selector 124. In accordance with a selection input 126 controlled by a CPU (not shown), the selector 124 selects and outputs to a zoom circuit 105 either the image signal of the reflected original from the input masking circuit 104 or an image signal sent in externally via a video interface circuit 205.

The zoom circuit 105 is for performing enlargement or reduction of the main scan. The results of zooming enter a LOG circuit 123 and a selector 125. Video data, which is the output of the LOG circuit 123, enters a memory 106, where the video data is stored as YMC data. This data is read out in conformity with the timing of each of four drums of the printer 352, described later. In accordance with a selection input 127 controlled by the CPU (not shown), the selector 125 selects and outputs to a masking-UCR circuit 107 either the image signal from the memory 106 or the image signal from the zoom circuit 105.

The masking-UCR circuit 107 subjects the output signal from the selector 125 (controlled by the CPU, which is not shown) to four-color masking-UCR processing. The output of the masking-UCR circuit 107 is γ-corrected by a γ-corrector circuit 109, whose output is subjected to edge-emphasis processing by an edge emphasizing circuit 110. The resulting signal is then subjected to add-on processing by an add-on unit 119. The output of the add-on unit 119 is delivered to the printer 352.

On the basis of an output DTOP 127 from a sensor, provided a fixed distance ahead of the end of the original, for detecting the original end position, a horizontal synchronizing signal generated internally or a synchronizing signal generated externally HSNC 129, a paper-edge sensor output ITOP1 (128) and an externally supplied sub-scan write-enable signal 536, an area generator 116 generates a signal 122 composed of one main-scan write-enable signal and read-enable signal regarding the memory 106, and a signal 121 composed of one sub-scan write-enable signal and four sub-scan read-enable signals, which correspond to respective ones of the four colors, regarding the memory 106, an image synthesizing area signal 126, a main-scan synchronizing signal HSNC 532, a main-scan enable signal HEM2 (543), outputted to the IPU 1008, a sub-scan synchronizing signal ITOP2 (531) outputted to the IPU, a main-scan enable signal HVE 534 outputted to another reader, and a sub-scan enable signal VVE (533) outputted to a further reader.

Numeral 130 denotes a video bus selector for outputting the signal from the reader to an external unit and inputting an external video signal.

(Description of bus selector)

Figure 8:
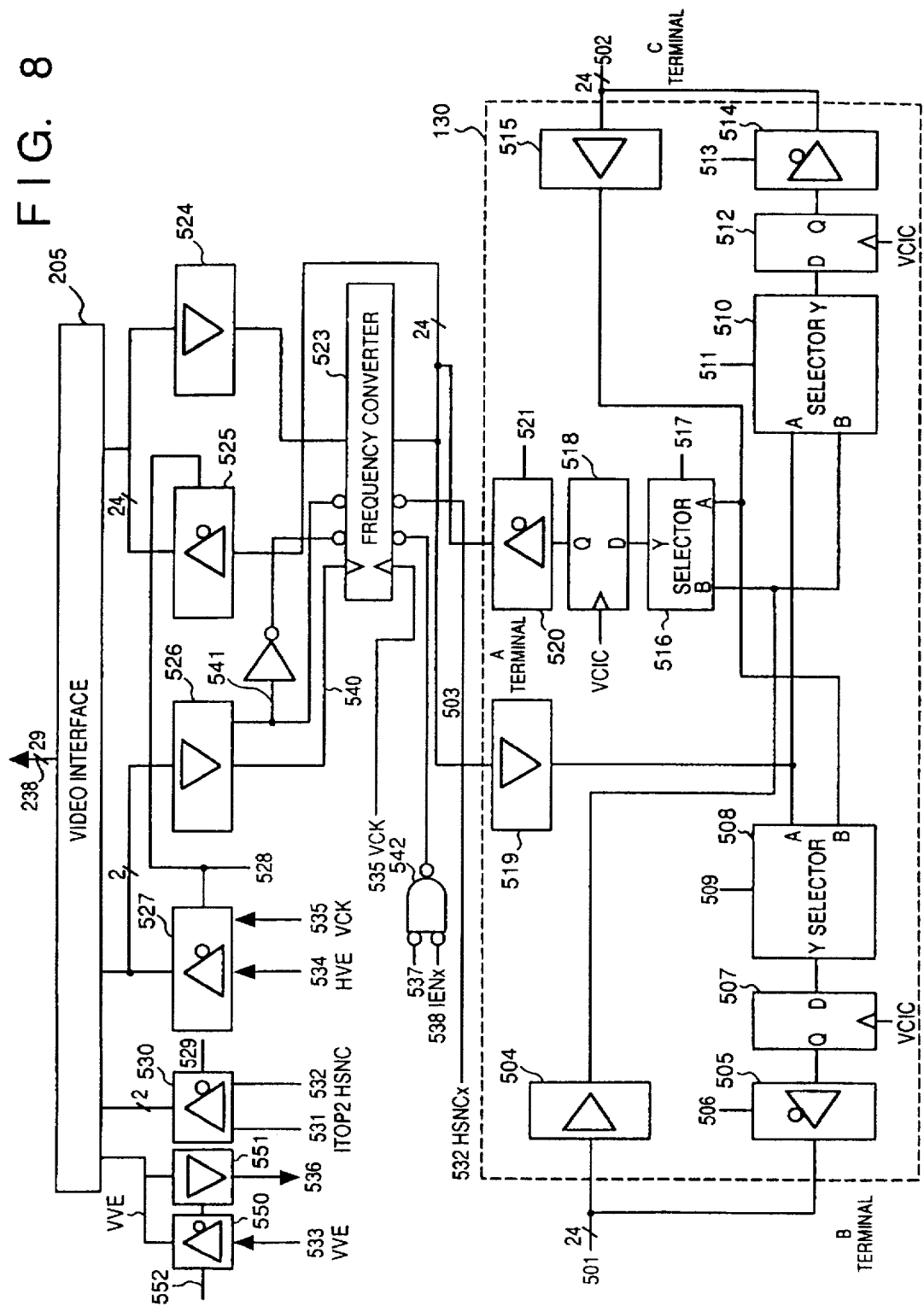
FIG. 8 is a block diagram showing a video-bus selector in FIG. 7 and equipment peripheral thereto.

FIG. 8 is a detailed block diagram showing the video bus selector 130 and equipment peripheral thereto. The video bus selector 130 and peripheral equipment include bidirectional buffers 504 and 505, 514 and 515, 519 and 520, 524 and 525, 526 and 527, signal lines 506, 513, 521, 528, 529 by which a CPU (not shown) controls the bidirectional buffers, an output buffer 530, a frequency converter (realized by a FIFO buffer) 523, a selector 508 for selecting and outputting either an A-terminal input, which is the signal from the video interface 205, or a C-terminal input, which is a signal 502 from the edge emphasizing circuit 110, a D-F/F 507, whose input is the output of the selector 508, a selector 510 for selecting and outputting the A-terminal input, which is the signal from the video interface 205, or a B-terminal input, which is a signal 501 from the bidirectional buffers 504, 505, a D-F/F 512, whose input is the output of the selector 510, a selector 516 for selecting and outputting the B-terminal input, which is a signal 501 from the bidirectional buffers 504, 505, or the C-terminal input, which is the signal 502 from the edge emphasizing circuit 110, a D-F/F 518, whose input is the output of the selector 516, an output buffer (three-state) of a sub-scan synchronizing signal ITOP2 (531) and main-scan synchronizing signal 532 of the memory unit (IPU), and an OR gate 542.

A VVE signal 533 is a sub-scan write-enable signal to other devices (reader/printers), generated by the area generator 116 based on the output DTOP, a signal 536 is a sub-scan write-enable signal to another device (master device), used as a sub-scan write-enable signal from the memory 106 when a tandem mode is the slave mode, and a signal 534 is a main-scan enable signal to other devices. A signal 541 is a main-scan enable signal (low active) from another device. This is a signal used as a write-enable signal and write-reset signal (the inverse of signal 539) of the frequency converter 523.

A signal 535 is a video clock within the device and sent to other devices, and a signal 540 is a video clock from another device and is used as a write clock of the frequency converter 523. A signal 532 is a signal which is the inverse of the main-scan synchronizing signal. This signal is used as a read-reset signal of the frequency converter 523. Signals 522, 529, 528, 537, 506, 509, 511, 513, 521, 517 are from I/O ports set by a CPU, not shown. A signal 538 is used as the enable signal (low-active) of the frequency divider 523. The signal 552 is an enable signal to allow the IPU or the external device to output the image signal so as to write the signal into the memory. The signal 529 is an enable signal (low-active) for outputting the image to the IPU; the signal 528, an enable signal (low-active) for outputting the image to the external device; and the signal 537, an enable signal (low-active) for inputting the image from the external device.

The A terminal 503, B terminal 501 and C terminal 502 in FIG. 8 respectively correspond to A0~A2, B0~B2, C0~C2 in the video selector of FIG. 1. The operation of the respective signals will be described in accordance with signal flow in the respective modes and the explanation of the synchronizing signals.

(Description of add-on unit)

The add-on unit 119 is a unit for adding on specific additional information (e.g., the machine number of each printer) for each printer. Control in the add-on unit 119 for adding on the specific information in this embodiment will be described below. The add-on unit has been disclosed in U.S. patent application Ser. No. 08/009,735 filed on Jan. 27, 1993.

Figure 9:
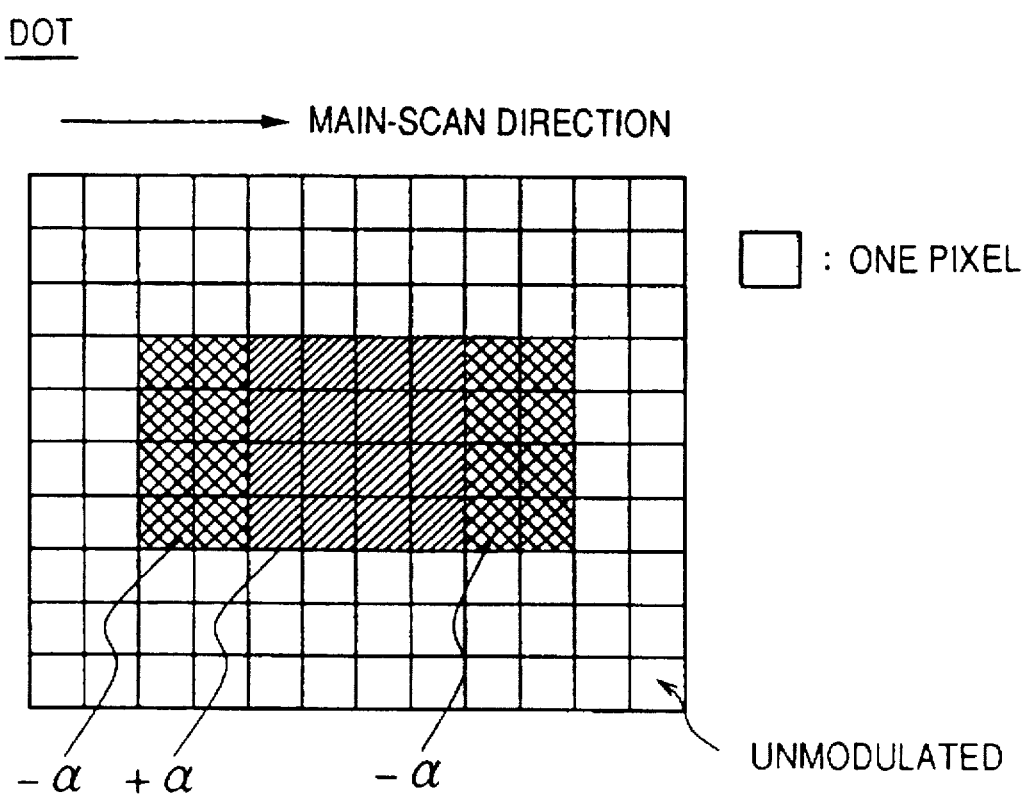
FIG. 9 is a diagram for describing a dot of an additional pattern in an add-on unit of this embodiment.

A method of adding on an additional pattern in this embodiment will now be described with reference to the example shown in FIG. 9. As indicated in black in FIG. 9, image signals of 4×4 or a total of 16 pixels are each represented by +α, and image signals of 2×4 pixels on left and right sides of the above-mentioned 4×4 pixels, for a total of 16 pixels, are each represented by −α, thereby forming a dot, which is adopted as one unit. The reason for this is that since well-known 200-line processing in an image area is carried out in the printing section of a color copier, there are cases in which reading is rendered difficult with add-on of a pattern of one pixel unit.

Figure 10:
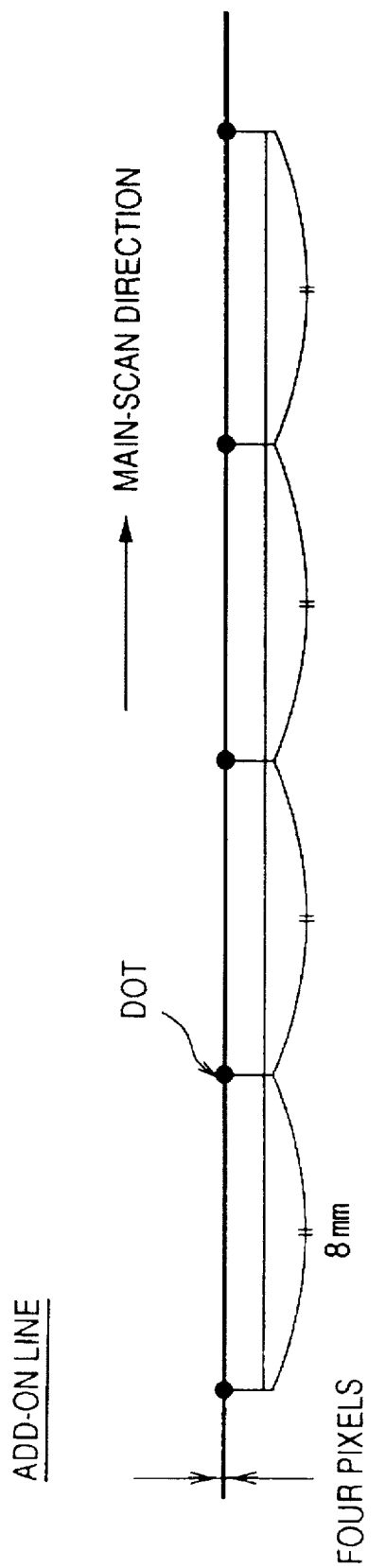
FIG. 10 is a diagram for describing an add-on line in the add-on unit of this embodiment.
Figure 11:
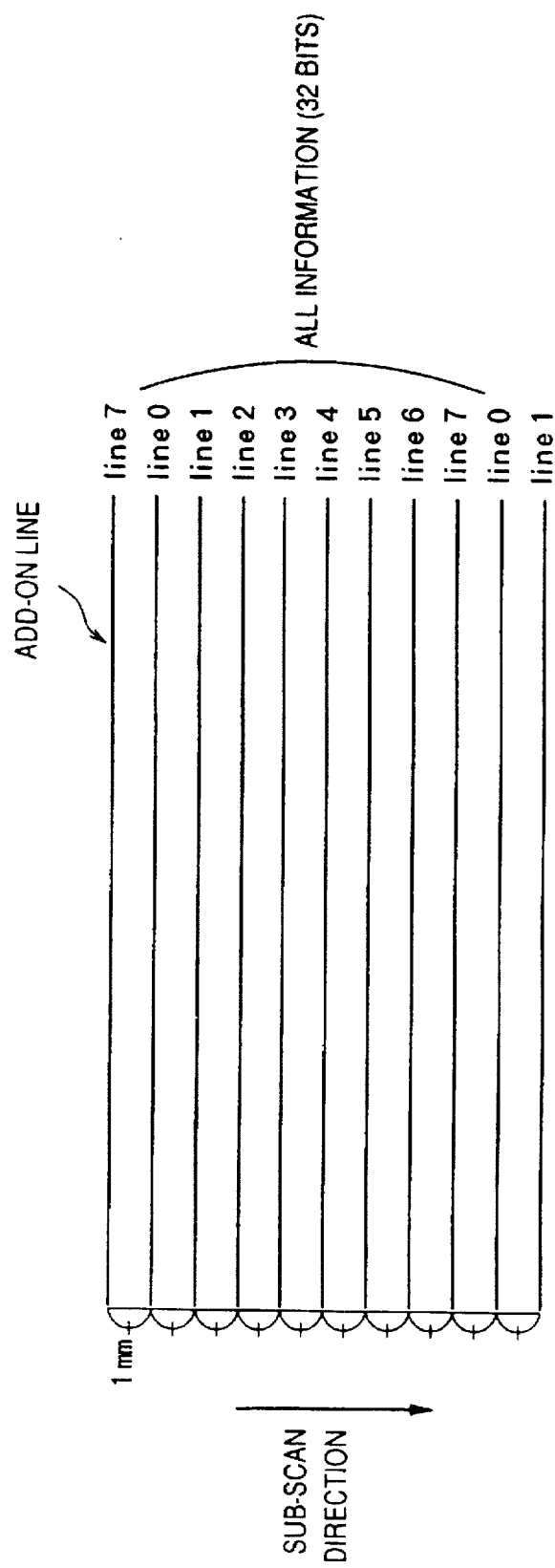
FIG. 11 is a diagram for describing a manner of arraying add-on lines in the add-on unit of this embodiment.

When dots such as this are arrayed equidistantly every 8 mm (128 pixels) in the main-scan direction, the result is referred to as an add-on line. An example of such an add-on line is illustrated in FIG. 10. The add-on line shown in FIG. 10 is arrayed equidstantly every 1 mm (16 pixels) in the sub-scan direction. FIG. 11 illustrates an example in which this add-on line is arrayed equidistantly every 1 mm (16 pixels) in the sub-scan direction. As will be described later, it is assumed that four bits of information is expressed by one add-on line, that all additional information (32 bits) is expressed by eight add-on lines, and that this is repeated in the sub-scan direction.

Figure 12:
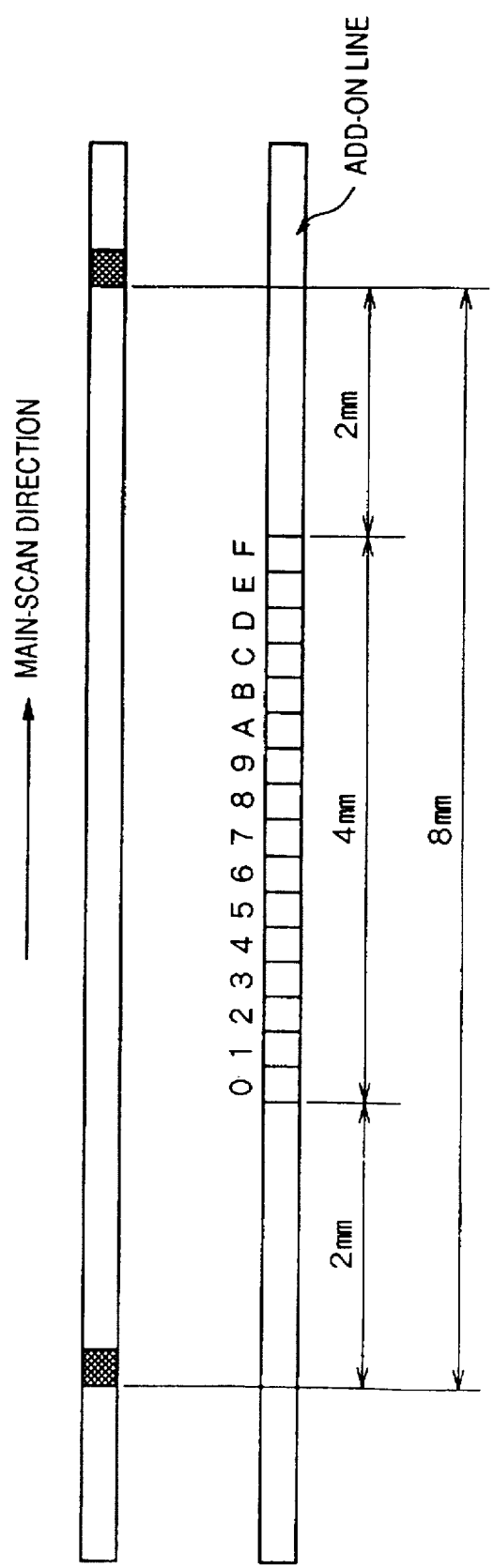
FIG. 12 is a diagram for describing a manner of representing an add-on line in the add-on unit of this embodiment.

As shown in FIG. 12, each add-on line carries information based upon a phase difference in dot position when the add-on line is compared with the immediately preceding add-on line. In order to prevent dots from becoming so close together as to be too conspicuous, it is so arranged that dots are not printed close to dots on the immediately preceding add-on line.

Figure 13A:
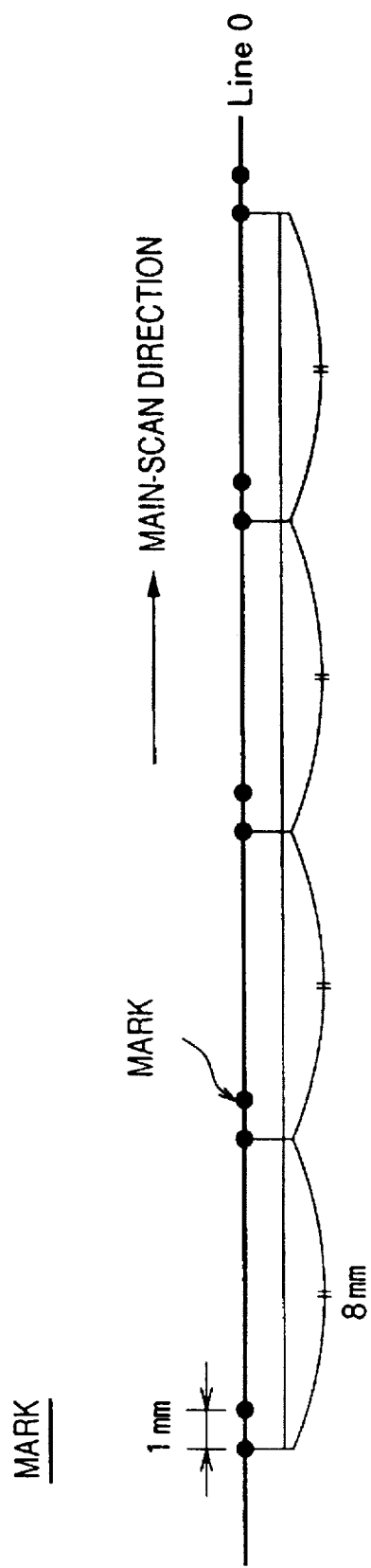
FIG. 13 is a diagram for describing marks of an add-on line in the add-on unit of this embodiment.
Figure 13B:
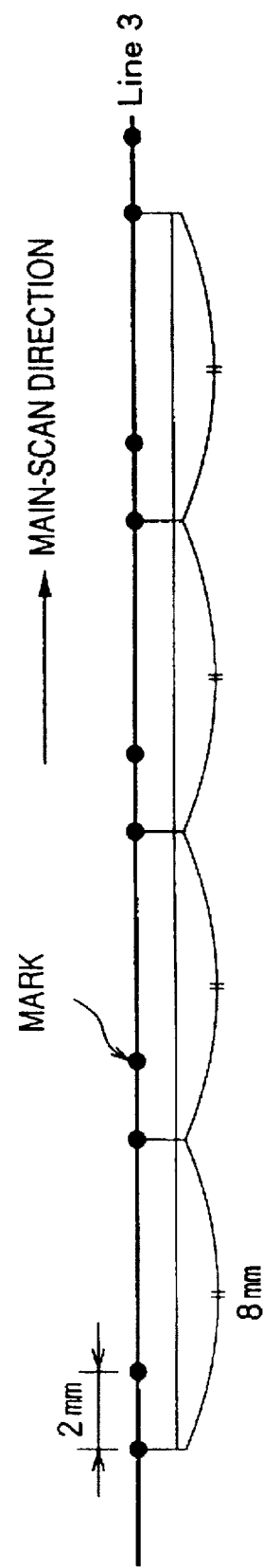

Further, as illustrated in FIG. 13, among the eight add-on lines (Line 0~Line 7) representing all of the additional information, a dot is added to the right of each dot on the first add-on line (Line 0) and the fourth add-on line (Line 3). The dot is added 1 mm to the right of the original dot position on Line 0, and the dot is added 2 mm to the right of the original dot position on Line 3. This is a mark for making clear which part of the total additional information is being represented by each add-on line.

Since top and bottom in the sub-scan direction cannot be determined from the copy with just one add-on line that adds on marks, the dots of the marks are added to two add-on lines. An added pattern in this embodiment is added solely by yellow toner so as not to be readily discriminated by the human eye. The reason for this is that the human eye has only a weak ability to discriminate patterns painted using yellow toner.

Further, it is required that the dot spacing (8 mm in this embodiment) in the main-scan direction and the interval (8 mm in this embodiment) at which all additional information is repeated in the sub-scan direction be determined in such a manner that all information will be reliably added on to a faint, uniform area in which dots can be reliably identified in the specific original of interest. As a yardstick, the information should be added on at a pitch which is one-half the width of a faint, uniform area in which dots can be reliably identified in the specific original of interest.

Figure 14:
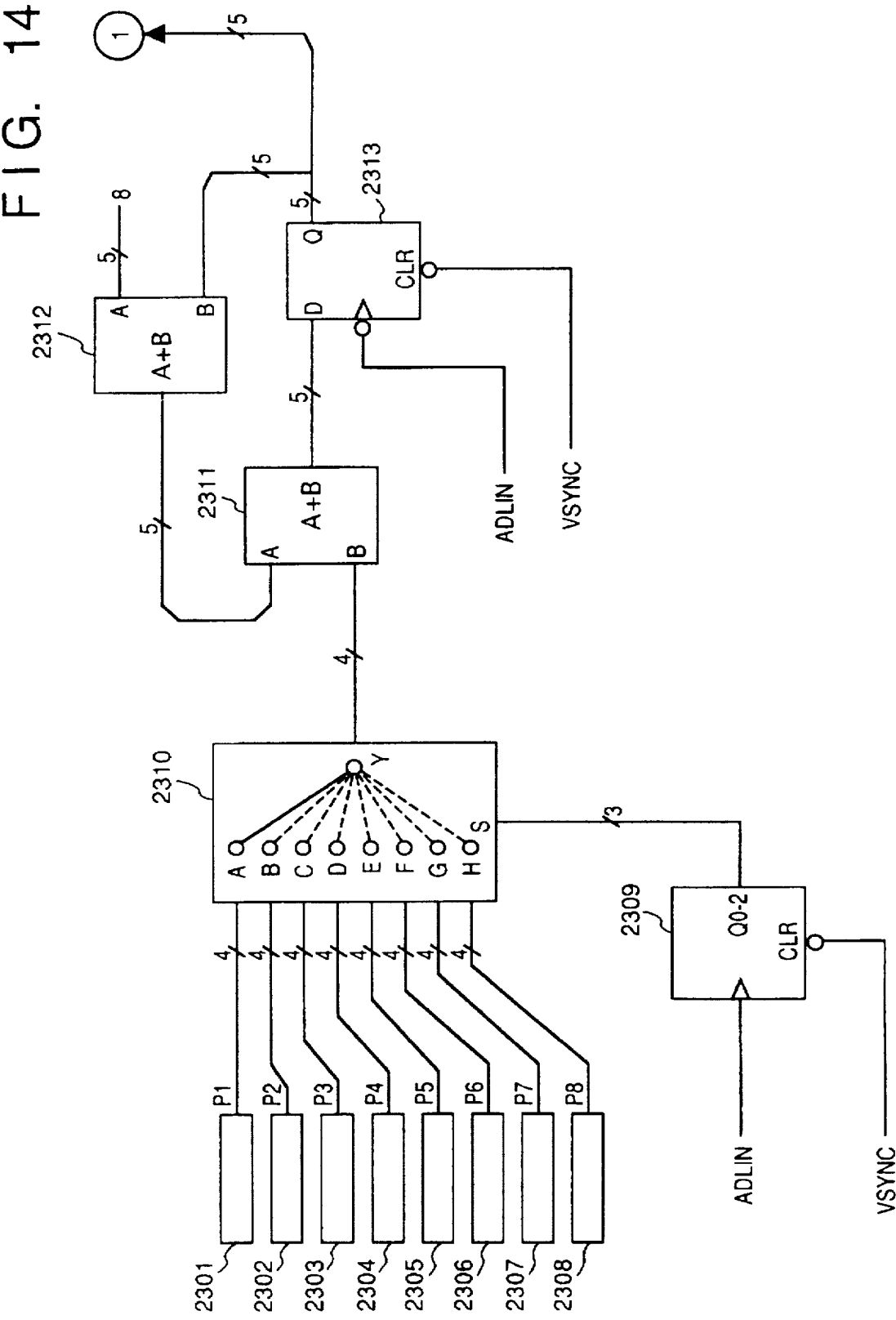
FIG. 14 is a block diagram showing the detailed construction of the add-on unit illustrated in FIG. 7.
Figure 15:
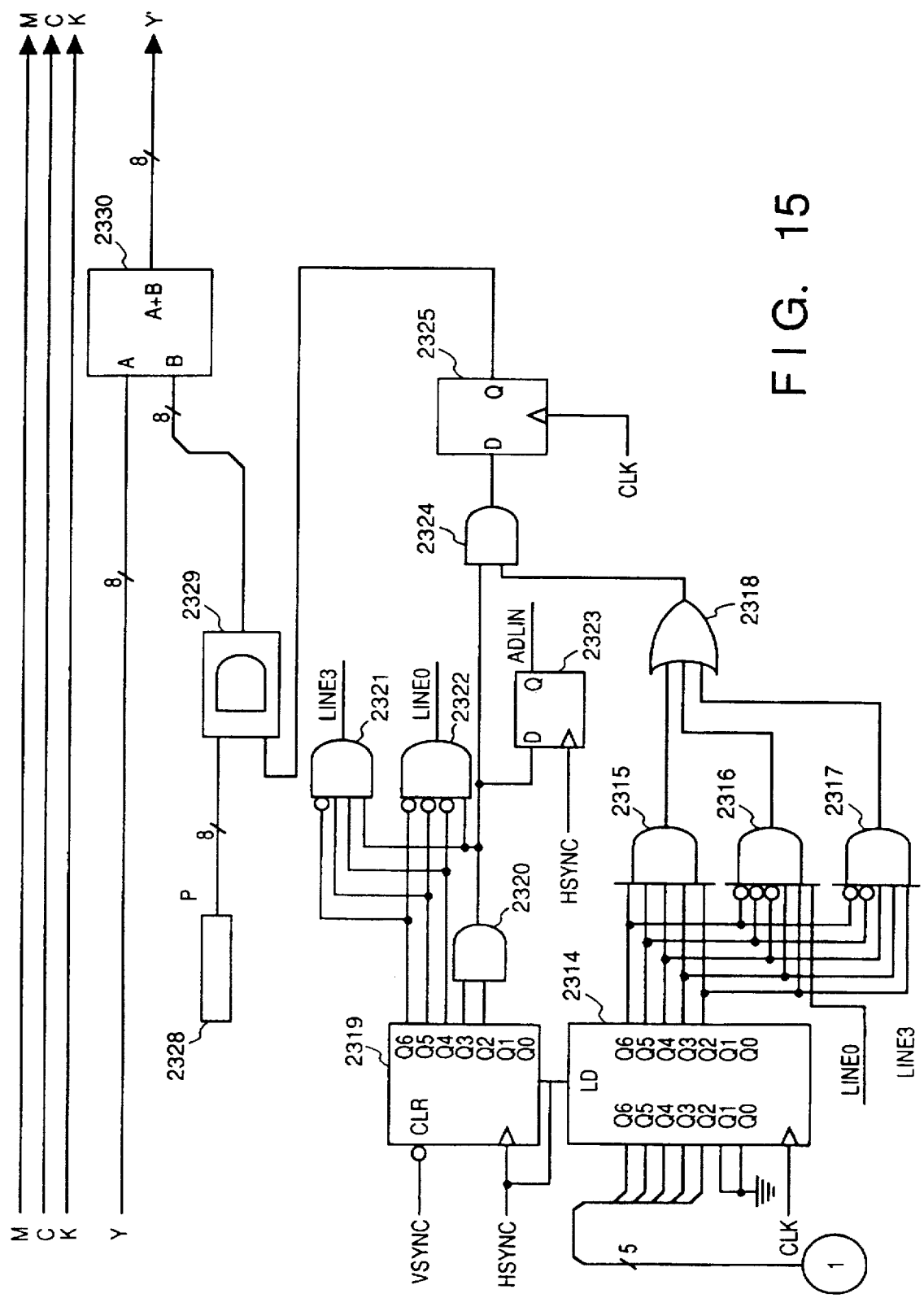
FIG. 15 is a block diagram showing the detailed construction of the add-on unit illustrated in FIG. 7.

The detailed construction of the add-on unit 119 according to this embodiment will now be described. FIGS. 14 and 15 are block diagrams illustrating the detailed construction of the add-on unit 119 according to the embodiment illustrated in FIG. 7.

The unit includes a sub-scan counter 2319 and a main-scan counter 2314. The sub-scan counter 2319 repeatedly counts the main-scan synchronizing signal HSYNC at a seven-bit width, namely at a period of 128, and the main-scan counter 2314 counts the pixel synchronizing signal CLK at the seven-bit width or period of 128. The output of an AND gate 2320 attains the H level when the bits 2 and 3 of the subordinate-scan counter 2319 are both at the H level. That is, an H output of four lines is obtained every 16 lines in the sub-scan direction. In this embodiment, this is adopted as an enable signal of an add-on line.

Further, LINE 0 and LINE 3 are produced by gates 2322, 2321, the inputs to which are the output of the AND gate 2320 and the three higher order bits of the sub-scan counter 2319. These are signals that attain the H level when the add-on lines are Line 0, Line 3.

Meanwhile, an initial value is loaded in the main-scan counter 2314 by HSYNC. Since the inputs to an AND gate 2315 are the four higher order bits of the main-scan counter 2314, the output thereof attains the H level for eight pixels every 128 pixels. This output is a dot enable signal. Further, gates 2316, 2317, to which the inputs are the four higher order bits of the main-scan counter 2314 and the outputs LINE 0, LINE 3 of gates 2322, 2321, produce enable signals of dots of the marks on Line 0 and Line 3 of the add-on lines, respectively.

These dot and mark enable signals are OR'ed by an OR gate 2318. Since the output of the OR gate 2318 becomes H even when there is no add-on line, it is so arranged that an L output is obtained from an AND gate 2324 in the absence of an add-on line (i.e., so that H is obtained only in the case of an add-on line). The output of the AND gate 2324 is synchronized by the CLK signal using a flip-flop 2325, whose output is delivered to an AND gate 2329.

The output of the AND gate 2329 enters an adder circuit 2330, where the signal is added solely to Y among the image signals M, C, Y, K. The output of the adder circuit 2330 is Y'. The adder circuit 2330, which is an adder having an eight-bit length, outputs zero when the result of addition becomes less than "0" and outputs "255" when the result of addition exceeds 255.

The value loaded in the main-scan counter 2314 is produced in the manner set forth below. First, a flip-flop 2313 and a counter 2309 are reset by VSYNC. Consequently, zero is set as the initial value of the main-scan counter 2314 in the case of the initial add-on line. A clock input ADLIN to the flip-flop 2309 is a signal that is the result of synchronizing the output of AND gate 2320, namely the add-on line enable signal, to HSYNC by means of a flip-flop 2323.

The output of the flip-flop 2313 is applied as the load value of the main-scan counter 2314 and is inputted also to an adder 2312. The latter adds on a constant value of 8. This is an offset value for assuring that dots will not be printed too close to dots on the immediately preceding line. The output of the adder 2312 is inputted to an adder 2311.

One other input to the adder 2311 has the output of a selector 2310 connected thereto. The selector 2310 selects one of registers 2301~2308 in which values of respective ones of the eight add-on lines have been set. Values which have been set in the registers 2301~2308 in this embodiment are specific to the apparatus and differ depending upon the stations constituting the concatenated system.

A select signal applied to the selector 2310 is produced by the counter 2309. Since the counter 2309 is initially reset by VSYNC, first the register 2301 is selected. The value in counter 2309 is incremented by the leading edge of the signal ADLIN, whereby the selector 2310 outputs the value of register 2302. This value and the output of the adder 2312 are added by the adder 2311. The output of the adder 2311 is latched by the flip-flop 2313 at the trailing edge of the signal ADLIN and is used as the initial value of the main-scan counter 2314. Thereafter, and in similar fashion, the initial value of the main-scan counter is set while the constant "8" and the register value of the next add-on line are added every add-on line.

[Results of Copying]

Figure 16:
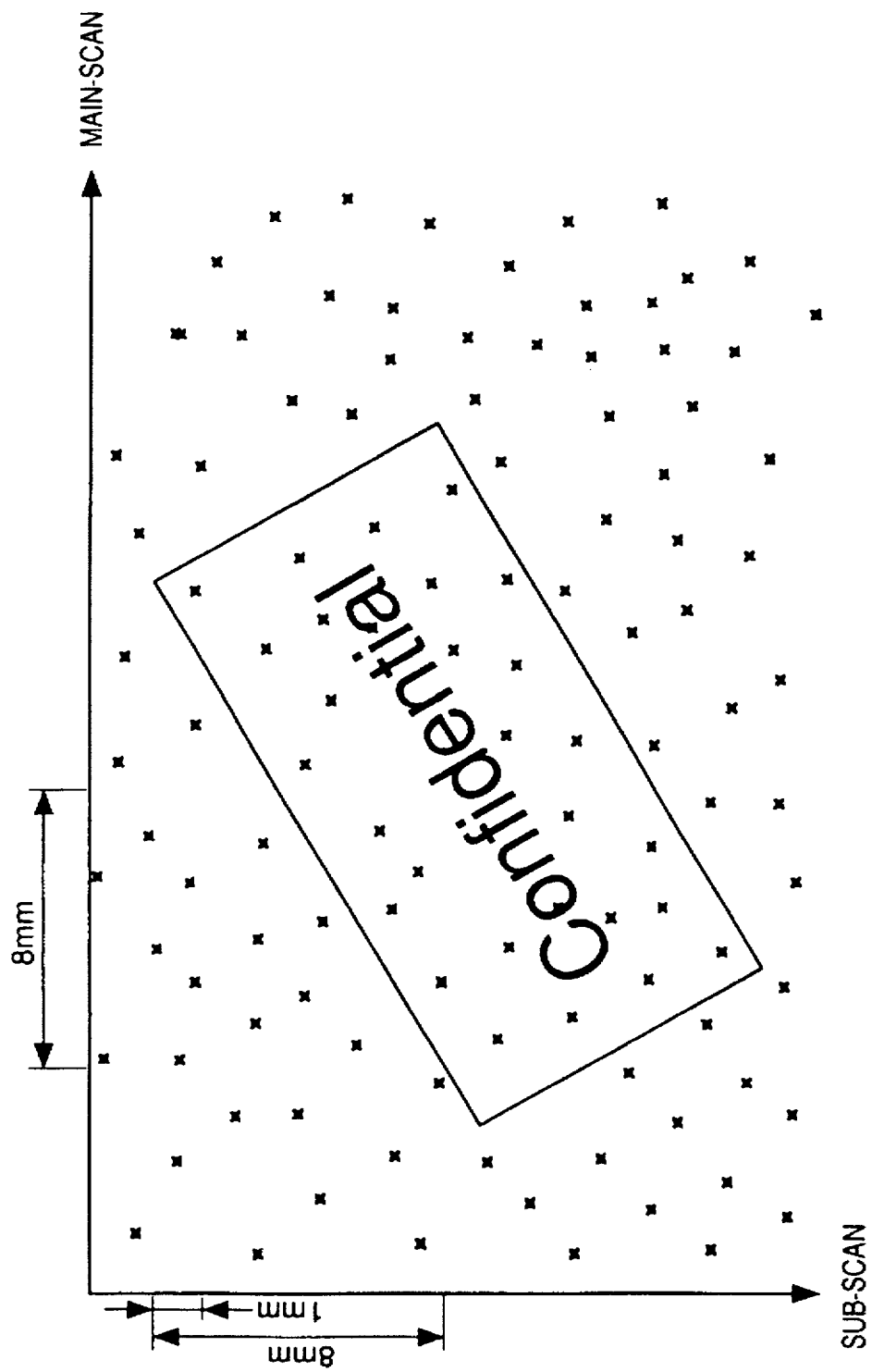
FIG. 16 is a conceptual view showing an example of the arrangement of dots by add-on processing in the add-on unit of this embodiment.

FIG. 16 is a diagram showing an example of the results of copying in a case where specific additional information is added on in this embodiment. In this example of copying shown in FIG. 16, only the arrangement of dots is shown. However, what is added on in this embodiment is not limited to a dot arrangement. The added-on patterns may be manufacturing numbers specific to the machine or the results of coding the manufacturing number. When the copy is examined, the apparatus that produced the copy can be identified.

(Description of signal flow and synchronizing signals in each mode)

The flow of video signals and setting of I/O ports in each mode of this invention will now be described with reference to FIGS. 7 and 8.

[Ordinary copying mode]

(1) Flow of image signal

Processing is executed sequentially in the order CCD 101→A/D & S/H circuit 102→shading circuit 103→input masking circuit 104→selector 124 [signal 126 is generated by the area generator based on the output DTOP and HSNC, at this time, "0" is set at the selection input]→zoom circuit 105→LOG circuit 123→memory 106→selector 125 ["0" is set at the selection input 127 by the CPU (not shown) so that the A input, i.e., the output from the memory, is selected]→masking-UCR circuit 107→γ-corrector circuit 109→edge emphasizing circuit 110→add-on unit 119→printer 352, and the image information resulting from reading of the image by CCD 101 is printed out by the printer 352, whereby a copy is obtained.

(2) Setting of I/O of video selector 130 and peripheral circuitry shown in FIG. 8

506→"1" (high level)
509→X
511→X
503→"1" (high level)
517→X
521→X
528→"1" (high level)
529→"1" (high level)
537→"1" (high level)
552→"1" (high level)

[Output to external interface]

(1) Flow of image signal

Processing is executed sequentially in the order CCD 101→A/D & S/H circuit 102→shading circuit 103→input masking circuit 104→selector 124 ["0" is inputted at the selection input 126 from the CPU (not shown) so that the A input is selected and outputted]→zoom circuit 105→selector 125 ["1" is set at the selection input 127 by the CPU (not shown) so that the B input, i.e., the output (RGB signal) from the zooming circuit, is selected]→masking-UCR circuit 107→γ-corrector circuit 109→edge emphasizing circuit 110→video selector 130→video interface 205, and the image information resulting from reading of the image by CCD 101 is outputted as an RGB signal by the external interface (video interface 205). At this time, the masking-UCR circuit 107 is set to pass the image through the circuit. Further, in the tandem mode, through setting is made so that the γ-correction and the edge emphasis are not performed. On the other hand, in the mode for writing to the IPU, the γ-corrector circuit 109 and the edge emphasis circuit performs the γ-correction and the edge emphasis upon the RGB signal before the data is outputted to the IPU.

(2) Setting of I/O of video selector 130 and peripheral circuitry shown in FIG. 8

506→"1" (high level)
509→X
511→X
513→"1" (high level)
517→"0" (low level)
521→"0" (low level)
528→"0" (low level)
529→"0" (low level)
537→"1" (high level)

---

552 → "0" (when the addres is "0" in the tandem mode)
"1" (in the other than the address "0" in the tandem mode)

---

[Input from external interface]

(1) Flow of image information (video)

Processing is executed sequentially in the order video interface 205→video-bus selector 130→selector 124 ["1" is inputted at the selection input 126 from the CPU (not shown)]→zoom circuit 105→LOG circuit 123→memory 106→selector 125 ["0" is set at the selection input 127 by the CPU]→masking-UCR circuit 107→γ-corrector circuit 109→edge emphasizing circuit 110→add-on unit 119→printer 352, and image information sent in from the outside via the video interface 205 is printed out by the printer 352, whereby a copy is obtained.

Furthermore, sub-scan write-enable of the memory 106 employs a signal 536 shown in FIG. 8 applied to the area generator via the video interface 205.

(2) Setting of I/O of video selector 130 and Peripheral circuitry shown in FIG. 8

506→"0" (low level)
509→"0" (low level)
511→X
513→"1" (high level)
517→"0" (low level)
521→"1" (high level)
528→"1" (high level)
529→"0" (low level)
537→"0" (low level)

---

552 → "0" (when the addres is "0" in the tandem mode)
"1" (in the other than the address "0" in the tandem mode)

---

(Construction of printer 352)

The detailed construction of the printer 352 according to this embodiment will now be described with reference also to FIG. 6. In FIG. 6, numeral 301 denotes a polygon scanner for causing laser beams to scan photosensitive drums, and 302 an image forming unit for magenta (M). Also provided are similarly constructed image forming units 303, 304, 305 for the colors cyan (C), yellow (Y), black (K), respectively.

Figure 17:
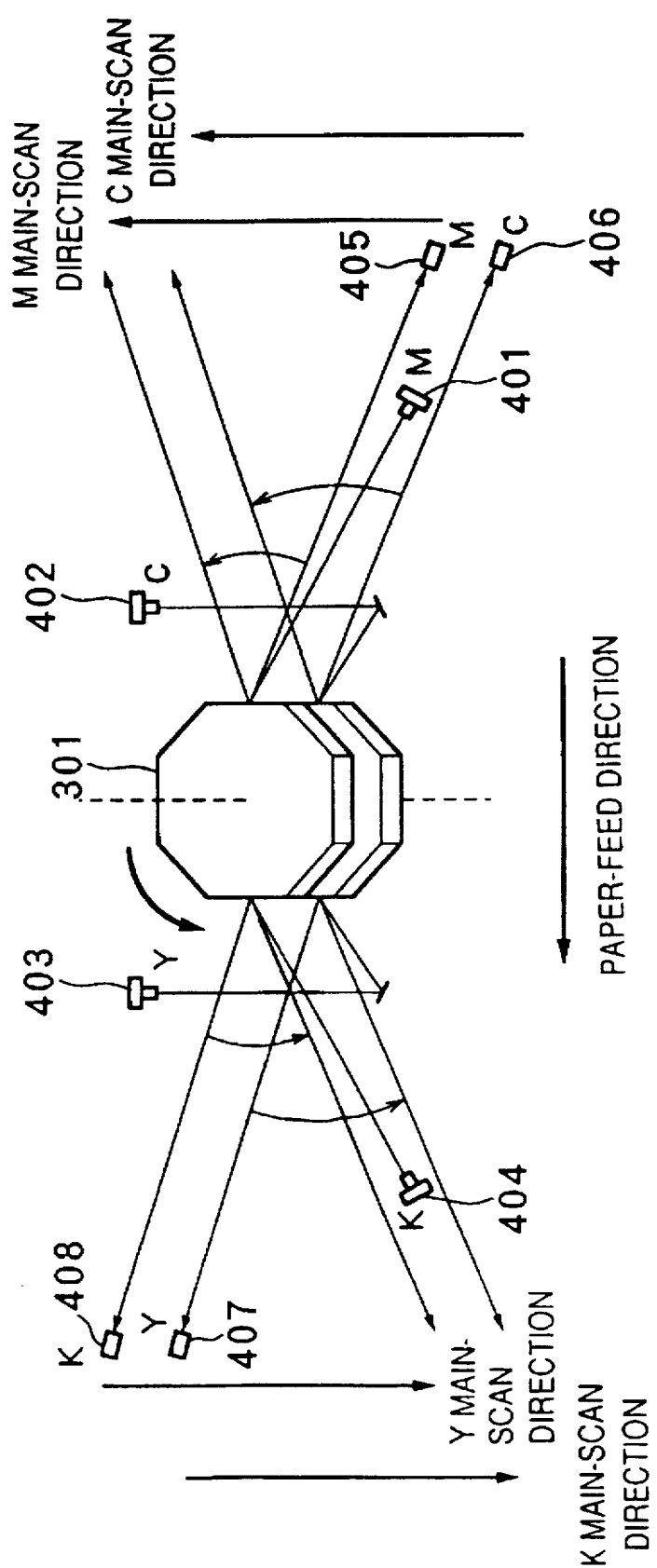
FIG. 17 is a conceptual view showing the construction of a polygon scanner in a reader of this embodiment.

As shown in FIG. 17, the polygon scanner 301 is so adapted that photosensitive drums for the colors M, C, Y, K are scanned by laser beams from laser elements 401~404 driven independently for the colors M, C, Y, K by a laser controller (not shown). Numerals 405~408 denote BD sensing means for sensing the scanned laser beams and generating the main-scan synchronizing signals.

In a case where two polygon scanners are arranged coaxially and rotated by one motor, as in this embodiment, the laser beams of M, C and the laser beams of Y, K, for example, have mutually opposing scanning directions in terms of the main-scan direction. As a consequence, ordinarily the control is performed in such a manner that the Y, K image data becomes a mirror image, in the main-scan direction, of the MC image data.

The image forming unit 302 has a fixing device 307. A transfer member is separated from a transfer belt 306 and is charged again by corona discharge in pre-fixing corona discharge devices 326, 327. The transfer member carries a toner image, which is fixed thermally to the transfer member by the fixing device 307. Cassettes 309, 310 accommodate transfer members. A paper-supply unit 308 supplies the transfer members from the cassettes 309, 310. An attracting corona discharge device 311 causes the transfer member, which has been supplied by the paper-supply unit 308, to the transfer member. A transfer-belt roller 312 cooperates with the attracting corona discharge device and, at the same time that it is used to rotate the transfer belt 306, causes the transfer member to be electrically attracted to the transfer belt 306.

A developing unit 313 is for developing the toner image on the drum 318 and includes a sleeve 314 for performing toner development by applying a developing bias, a primary corona discharge device for charging the photosensitive drum 318 to a desired potential by corona discharge, and an auxiliary corona discharge device 316 for de-electrifying the surface of the drum 318 cleaned by a cleaner 317 so that appropriate charging is performed in the primary corona discharge device 315. The cleaner 317 is for cleaning off the surface of the photosensitive drum 318 after transfer. The photosensitive drum 318 has a latent image formed thereon by exposure to laser light. Numeral 319 denotes a transfer corona discharge device for performing discharge from the back side of the transfer belt 306 and transferring the toner image from the drum 318 to the transfer member.

Numerals 322, 323 denote transfer-belt de-electrifying corona discharge devices for de-electrifying the transfer belt 306 and initializing the same electrostatically. A de-electrifying corona discharge device 324 is for facilitating the separation of the transfer member from the transfer belt 306. A peel-off corona discharge device 325 prevents disturbance of the image due to peel-off discharge when the transfer member is separated from the transfer belt. The pre-fixing corona discharge devices 326, 327 prevent disturbance of the image by strengthening the fixing force of the toner on the transfer member after separation. A belt cleaner 328 prevents disturbance of the transfer belt 306.

Numeral 329 denotes a paper-edge sensor for sensing the leading edge of the transfer member supplied to the transfer belt by the paper-supply unit 308. The output signal from this sensor is sent from the printer to the reader and is used in order to generate the sub-scan synchronizing signal when the video signal is sent from the reader to the printer. Numeral 330 denotes a pre-exposure lamp for removing residual electric charge on the drum 318, and numeral 340 designates a paper-ejection sensor for sensing the transfer member on the conveyance path as the transfer member passes by the fixing unit.

(Station interface units)

Figure 18:
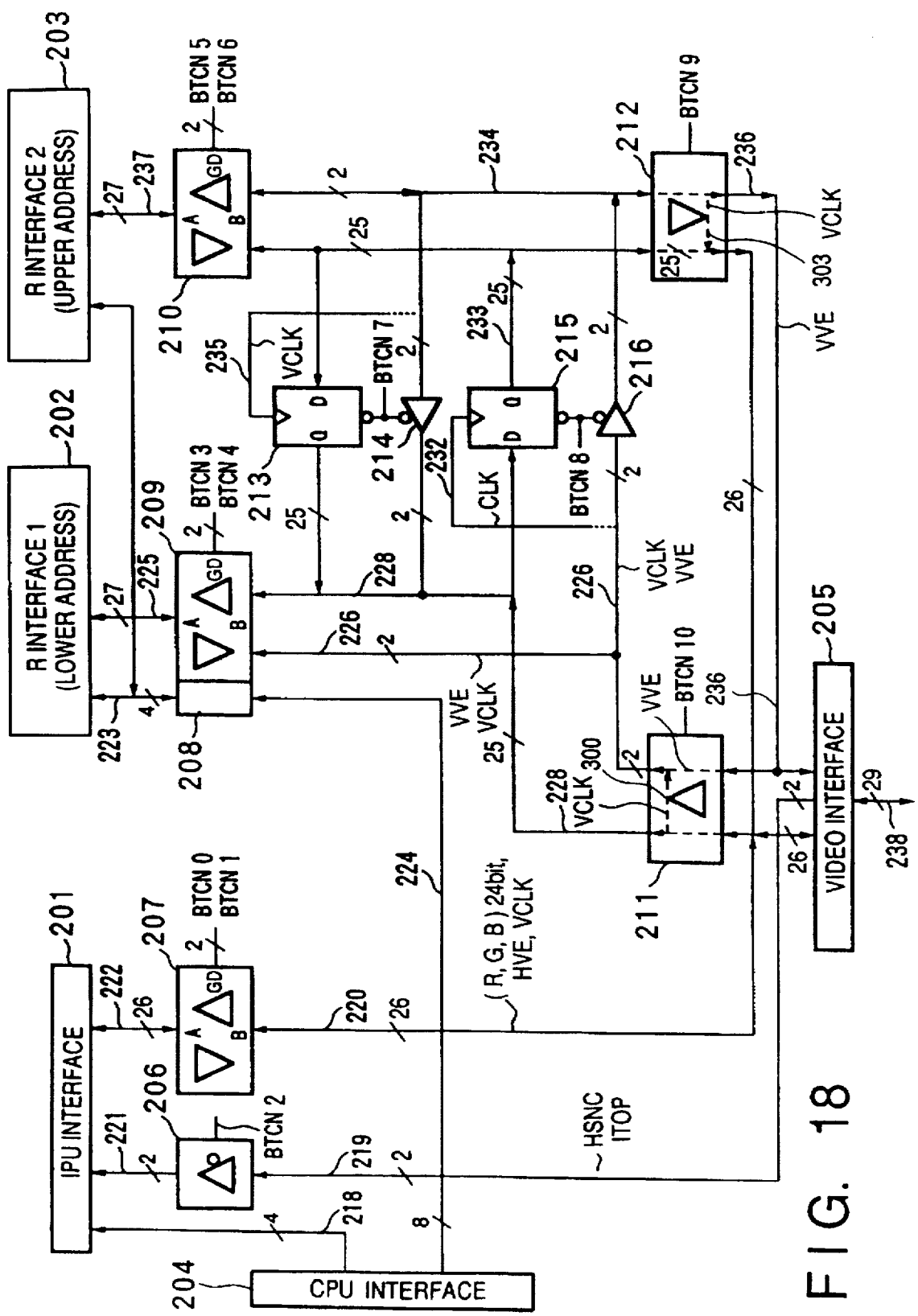
FIG. 18 is a diagram showing the detailed arrangement of interfaces with other apparatus shown in FIG. 2.

FIG. 18 illustrates the detailed construction of the I/F units 1101~1104 in each station shown in FIG. 2. FIG. 18 also illustrates the flow of video and synchronizing signals in each mode.

The I/F units 1101~1104 shown in FIG. 18 are equipped with the interface 201 (IPU interface), which is for interfacing the memory unit (IPU), in addition to the interfaces described below.

More specifically, in addition to the interface 201 interfacing the memory unit (IPU), there are an interface 202 (R interface 1) and 203 (R interface 2) for interfacing another device (copier), a CPU interface 204 for supervising communication with another host device or the like, and an interface 205 (video interface) for interfacing the main body, for a total of five interfaces.

Also included according to this embodiment are tri-state buffers 206, 211, 212, 214, 216, bidirectional buffers 207, 209, 210, a special bidirectional buffer 208 having an eight bit—to four bit conversion function, and D-type flop-flops 213, 215 having a tri-state function.

Further, BCTN0~BTCH10 denote I/O ports set by a CPU, not shown, 218 a communication line (four bits) 218 for communication between the IPU and main body, 219 a main-scan synchronizing signal HSC and a sub-scan synchronizing signal ITOP, 220 a 27-bit signal comprising three channels of eight-bit video signals+binary signal BI+image clock+main-scan enable signal HVE, 221 a signal similar to the signal 219, 222 a signal similar to the signal 220, 224 an eight-bit signal on a communication line for communication with another device (copier), and 223 a four-bit signal (described in detail later together with each communication line) on a communication line for communication with another device (copier).

A signal 225 is the combination of the signals 226 (two bits) and 228 (25 bits); numeral 226 denotes a two-bit (one bit within 236 and 220) signal of the image clock and sub-scan video-enable signal VVE; 228, a 25-bit signal composed of three channels HVE; 232, an image clock (one bit within 226); 233, a 25-bit signal composed of three channels HVE; 234, a two-bit signal of the image clock VCLK and sub-scan enable signal VVE; 235, an image clock (one bit within 235); 237, the combination of the signal 233 and the signal 234; 236, the signal WE; and 238, a 29-bit signal composed of the signals 220 (26 bits), HSNC, VVE, ITOP. Note that numerals 300 and 303 respectively denote a line for one bit of the clock VCLK separated from the two bit signal.

The tri-state buffers 206, 211, 212, 214 and 216 are enabled when the control signals (BTCN2, BTCN10, BTCN9, BTCN7, BTCN8) applied to the buffers are low ("0"), and attain a high impedance when the control signals are high ("1"). The bidirectional buffers 207, 209 and 210 are realized by an element such as "LS245". In correspondence with the control signals (BTCN0 and BTCN1, BTCN3 and BTCN4, BTCN5 and BTCN6) applied to the G and D-terminals of the respective elements, if G-terminal status is low ("0") and D-terminal status if low ("0"), the data flow is A→B; if the G-terminal status is low ("0") and the D-terminal status is high ("1"), the data flow is B→A; and if the G-terminal status is high ("1"), the data flows in any direction (isolation status). The D-flip-flops 213 and 215 are enabled when the enable signals (BTCN7, BTCN8) are low ("0"), and attain a high impedance when the enable signals are high ("1"). The D-flip-flops maintains output timings of the video clock and the synchronizing signal HYNC, the enable signal HVE and the video signal to another station constant.

In the tandem system of the present embodiment, the IPU 1008 and the stations 1001 to 1004 are mutually connected. The stations 1001 to 1004 have the same construction, and the stations respectively have a data transmission/reception/transfer mode to be described below, so as to transfer or transmit/receive image video data between them, regardless of the master-slave relation, i.e., what station is assigned as a master station and what station is assigned as a slave station.

The following explanation about the data transmission/reception/transfer mode is based on the relation between one of the stations (referred to as "Current station") as the central station and other stations. When the "Current station" does not input data but relays the data to another station and/or the IPU, the operation is expressed as "Relay". A station having a smaller address value than that of the current station is represented as "Lower station", and a station having a larger address value than that of the current station is represented as "Upper station".

Mode 1: IPU→Relay→Lower station
Mode 2: IPU Relay Upper station
Mode 3: IPU Current station
Mode 4: Lower station Relay Upper station
Mode 5: Lower station Current station
Mode 6: Upper station Relay Lower station
Mode 7: Upper station Current station
Mode 8: Current station IPU
Mode 9: Current station Lower station
Mode 10: Current station Upper station
Mode 11: IPU Relay Upper and Lower stations
Mode 12: IPU Current station and Relay Lower station
Mode 13: IPU Current station and Relay Upper station
Mode 14: IPU Current station and Relay Upper and Lower station
Mode 15: Lower station Current station and Relay Upper station
Mode 16: Upper station Current station and Relay Lower station
Mode 17: Current station IPU and Lower station
Mode 18: Current station IPU and Upper station
Mode 19: Current station Upper and Lower stations
Mode 20: Current station IPU and Upper and Lower stations Note that the interface 201 is employed for the data transmission/reception and relaying to the IPU 1008; the interface 202, for the data transmission/reception and relaying to the lower station; and the interface 203, for the data transmission/reception and relaying to the upper station.

Thus, as the respective stations have the data relaying function, even when one of the stations transfers data to a distant station, the other stations between the transferring station and the receiving station sequentially relay the data. Accordingly, regardless of the number of stations connected for the relaying, the actual transfer is data transmission/reception between two stations of a series of two address values and data transmission/reception to the IPU. That is, the stations may have data transfer capability for only three receiver (or transmitter).

The digital copying machine (digital image processing section?) of this embodiment has the data transmission/reception and relaying mode as described above, the number of data-transfer destination stations (or receiving stations) of the respective stations (digital copying machine) is limited to three, regardless of the number of the stations connected to the tandem system. So far as one of these stations is used as a data transmitter station and the stations are connected as shown in FIGS. 1 and 2, any number of stations are connectable for data transfer.

Next, the status of the control signals BTCN0 to BTCN10 from the CPU in the respective modes will be described below.

(Flow of video and synchronizing signal in each mode)
Control of I/O ports and the flow of signals in each mode in the arrangement of FIG. 18 will now be described.

[IPU interface→R interface 1 transfer (mode 1)]

BTCN0←"1" (high level)
BTCN1←"0" (low level)
BTCN2←"0" (low level)
BTCN3←"0" (low level)
BTCN4←"0" (low level)
BTCN5←X
BTCN6←X
BTCN7 ←"1" (high level)
BTCN8←X
BTCN9←"1" (high level)
BTCN10←"0" (low level)

It should be noted that X represents "don't care". It is assumed that control is performed in such a manner that signals will not collide.

Signal flow is signal line 238→signal line 219→signal line 221 (HSNC and ITOP from the video interface 205 to the IPU interface 201)→signal line→signal line 220→signal line 228→signal line 225 (the image signal (24 bits) and HVE from the IPU interface 201 to the R interface 1), and signal line 238 (VVE)→signal line 236 (VVE)→signal line 300 (VCLK)→signal line 226+signal line 225 (VCLK and VVE from the video interface 205 to the R interface 1).

That is, in the present embodiment, in a case where the image data (RGB 24 bits) from the IPU interface 201 is transferred to a station having an upper address, the clock VCLK is inputted via the IPU interface, while the signal VVE is outputted from the transmitter station to the upper-address station. This is because the system is arranged so that a transmitter station is used as a master station to control the other stations.

[IPU interface→R interface 2 transfer (mode 2)]
BTCN0←"1" (high level)
BTCN1←"0" (low level)
BTCN2←"0" (low level)
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BTCN10←"0" (low level)

Signal flow is signal line 238→signal line 219→signal line 221→signal line 222→signal line 300→signal line 228→signal line 233→237, and signal line 238→signal line 236+signal line 300→signal line 226→signal line 234→signal line 237.

[IPU interface→R interface 2 transfer (mode 3)]
BTCN0←"1" (high level)
BTCN1←"0" (low level)
BTCN2←"0" (low level)
BTCN3←X
BTCN4←X
BTCN5←X
BTCN6←X
BTCN7←X
BTCN8←X
BTCN9←"1" (high level)
BTCN10←"0" (low level)

Signal flow is signal line 238→signal line 219→signal line 221, and
signal line 222→signal line 220→signal line 238.

[R interface 1→R, interface 2 transfer (mode 4)]
BTCN0←X
BTCN1←X
BTCN2←X
BTCN3←"1" (high level)
BTCN4←"0" (low level)
BTCN5←"0" (low level)
BTCN6←"0" (low level)
BTCN7←"1" (high level)
BTCN8←"0" (low level)
BTCN9←X
BTCN10←"1" (high level)

Signal flow is signal line 225→signal line 238→signal line 233→signal line 237,
signal line 225→signal line 226→signal line→signal line 227.

[R interface 1→video interface transfer (mode 5)]
BTCN0←X
BTCN1←"1" (high level)
BTCN2←X
BTCN3←"1" (high level)
BTCN4←"0" (low level)
BTCN5←X
BTCN6←"1" (high level)
BTCN7←"1" (high level)
BTCN8←"0" (low level)
BTCN9←X
BTCN10←"1" (high level)

Signal flow is signal line 225→signal line 228→signal line 226→signal line 233+signal line 234→signal line 220→signal line 238, and
signal line 225→signal line 226→signal line 234→signal lane 236→signal line 238.

[R interface 2→video interface transfer (mode 6)]
BTCN0←X
BTCN1←X
BTCN2←X
BTCN3←"0" (low level)
BTCN4←"0" (low level)
BTCN5←"1" (high level)
BTCN6←"0" (low level)
BTCN7←"0" (low level)
BTCN8←"1" (high level)
BTCN9←X
BTCN10←"1" (high level)

Signal flow is signal line 237→signal line 233→signal line 228→signal line 225, and
signal line 237→signal line 234→signal line 226→signal line 225.

[R interface 2→video interface transfer (mode 7)]
BTCN0←X
BTCN1←"1" (high level)
BTCN2←X
BTCN3←X
BTCN4←X
BTCN5←"1" (high level)
BTCN6←"0" (low level)
BTCN7←X
BTCN8←"1" (high level)
BTCN9←"0" (low level)
BTCN10←X Signal flow is signal line 237→signal line 233+signal line 234→signal line 220→signal line 238, and
signal line 237→signal line 234→signal line 236→signal line 238.

[Video interface→IPU interface transfer (mode 8)]
BTCN0←"0" (low level)
BTCN1←"0" (low level)
BTCN2←"0" (low level)
BTCN3←X
BTCN4←X
BTCN5←X
BTCN6←X
BTCN7←X
BTCN8←X
BTCN9←"1" (high level)
BTCN10←X Signal flow is signal line 238→signal line 220+signal line 222, and signal line 238→signal line 219→signal line 221.
[Video interface→R interface 1 transfer (mode 9)]
BTCN0←X
BTCN1←"1" (high level)
BTCN2←X
BTCN3←"0" (low level)
BTCN4←"0" (low level)
BTCN5←X
BTCN6←X
BTCN7←"0" (low level)
BTCN8←X
BTCN9←"1" (high level)
BTCN10←"0" (low level)
Signal flow is signal line 238→signal line 220→signal line 228→signal line 225, and
signal line 238→signal line 236+signal line 300→signal line 226→signal line 225.
[Video interface→R interface 2 transfer (mode 10)]
BTCN0←X
BTCN1←"1" (high level)
BTCN2←X
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BTCN10←"0" (low level)
Signal flow is signal line 238→signal line 220→signal line 228→signal line 233→signal line 237, and
signal line 238→signal line 236+signal line 300→signal line 226→signal line 234→signal line 237.
[Mode 1+mode 2 (mode 11)]
BTCN0←"1" (high level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BTCN10←"0" (low level)
Signal flow is signal line 238→signal line 219→signal line 221,
signal line 222→signal line 220→signal line 228→signal line 225,
signal line 222→signal line 220→signal line 228→signal line 233→signal line 237,
signal line 238→signal line 236+signal line 300→signal line 226→signal line 225, and
signal line 238→signal line 236+signal line 300→signal line 226→signal line 234→signal line 237.
[Mode 1+mode 3 (mode 12)]
BTCN0←"1" (high level)
BTCN1←"0" (low level)
BTCN2←"0" (low level)
BTCN3←"0" (low level)
BTCN4←"0" (low level)
BTCN5←X
BTCN6←"1" (high level)
BTCN7←"1" (high level)
BTCN8←X
BTCN9←"1" (high level)
BTCN10←"0" (low level)
Signal flow is signal line 238→signal line 219→signal line 221,
signal line 222→signal line 220→signal line 238,
signal line 222→signal line 220→signal line 228→signal line 225, and
signal line 238→signal line 236+signal line 300→signal line 226→signal line 225.
[Mode 2+mode 3 (mode 13)]
BTCN1←"0" (low level)
BTCN2←"0" (low level)
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BTCN10←"0" (low level)
Signal flow is signal line 238→signal line 219→signal line 221,
signal line 222→signal line 220→signal line 238,
signal line 222→signal line 220→signal line 228→signal line 233→signal line 237, and
signal line 238→signal line 236+signal line 300→signal line 226→signal line 234→signal line 237.
[Mode 1+mode 2+mode 3 (mode 14)]
BTCN0←"1" (high level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BTCN10←"0" (low level)
Signal flow is signal line 238→signal line 219→signal line 221 (ITOP and HSNC from the video interface 205 to the IPU interface 201),
signal line 222→signal line 220→signal line (HVE and VCLK from the IPU interface 201 to the video interface 205),
signal line 222→signal line 238→signal line 225 (HVE and VCLK from the IPU interface 201 to the R interface 202),
signal line 222→signal line 220→signal line 238→signal line 233→signal line 237 (HVE and VCLK from the IPU interface 201 to the R interface 202),
signal line 238 (VVE)→signal line 236 (VVE)+signal line 300 (VCLK)→signal line 226 (VVE, VCLK)→signal line 225 (VCLK from the IPU interface 201 and VVE from the video interface 205 to the R interface 202), and signal line 238 (VVE)→signal line 236→signal line 220→signal line 226→signal line 234→signal line 237 (VCLK from the IPU interface 201 and VVE from the video interface 205 to the R interface 202).

As the present embodiment has a circuit as shown in FIG. 18 that operates in the mode 14, the image data from the IPU interface 201 can be transferred to the current station and another station simultaneously.

[Mode 4+mode 5 (mode 15)]
BTCN0←X
BTCN1←X
BTCN2←"1" (high level)
BTCN3←"1" (high level)
BTCN4←"0" (low level)
BTCN5←"0" (low level)
BTCN6←"0" (low level)
BTCN7←"1" (high level)
BTCN8←"0" (low level)
BTCN9←"0" (low level)
BTCN10←"1" (high level)
Signal flow is signal line 225→signal line 228→signal line 233→signal line 237, signal line 225→signal line 226→signal line 234→signal line 237, signal line 225→signal line 226+228→signal line 234+233→signal line 220→signal line 238, and signal line 225→signal line 226→signal line 234→signal line 236→signal line 238.

[Mode 6+mode 7 (mode 16)]
BTCN0←X
BTCN1←"1" (high level)
BTCN2←X
BTCN3←"0" (low level)
BTCN4←"0" (low level)
BTCN5←"1" (high level)
BTCN6←"0" (low level)
BTCN7←"0" (low level)
BTCN8←"1" (high level)
BTCN9←X
BTCN10←"1" (high level)
Signal flow is signal line 237→signal line 233→signal line 228→signal line 225, signal line 237→signal line 234→signal line 226→signal line 225, signal line 237→signal line 233+234→signal line 220→signal line 238, and signal line 237→signal line 234→signal line 236→signal line 238.

[Mode 8+mode 9 (mode 17)]
BTCN0←"0" (low level)
BTCN1←"0" (low level)
BTCN2←"0" (low level)
BTCN3←"0" (low level)
BTCN4←"0" (low level)
BTCN5←X
BTCN6←X
BTCN7←"1" (high level)
BTCN8←X
BTCN9←"1" (high level)
BTCN10←"0" (low level)
Signal flow is signal line 238→signal line 219→signal line 221, signal line 238→signal line 228→signal line 225, and signal line 238→signal line 220+300→signal line 226→signal line 225.

[Mode 8+mode 10 (mode 18)]
BTCN0←"0" (low level)
BTCN1←"0" (low level)
BTCN2←"0" (low level)
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BTCN10←"0" (low level)
Signal flow is signal line 238→signal line 219→ signal line 221, signal line 238→signal line 228→signal line 233→signal line 237, and signal line 238→signal line 220+300→signal line 226→signal line 234→210.

[Mode 9+mode 10 (mode 19)]
BTCN0←X
BTCN1←"0" (low level)
BTCN2←X
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BTCN10←"0" (low level)
Signal flow is signal line 238→signal line 228→signal line 225, signal line 238→signal line 228→signal line 233→signal line 237, signal line 238→signal line 220+236→signal line 226→signal line 225, and signal line 238→signal line 220+300→signal line 226→signal 234→signal line 237.

[Mode 8+mode 9+mode 10 (mode 20)]
BTCN0←"0" (low level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BTCN10←"0" (low level)
Signal flow is signal line 238→signal line 219→signal line 221, signal line 238→signal line 220→222, signal line 238→signal line 228→signal line 225, signal line 238→signal line 220+236→signal line 226→signal line 225, and signal 238→signal line 220+300→signal line 226→signal line 234→signal line 237.

Thus, in accordance with this embodiment as described above, it is possible to specify a printer, which has been used in printing out an output image, from additional information added on to the output image.

<Second Embodiment>

In the first embodiment set forth above, an example is described in which the information added on differs for each station (each printer) constituting the concatenated system. However, the invention is not limited to the foregoing example but can be adapted to perform control in such a manner that identical information is added on for all stations. A second embodiment according to the invention adapted to perform control in this manner will be described below. In this embodiment also, the basic construction is approximately the same as that of the first embodiment.

In the second embodiment, the additional information is stored in the registers 2301~2308 for add-on processing shown in FIG. 14. This value is sent by communication from the station which is the source of image transfer and is set by the CPU of each station, whereby it is possible to add on the same information at all stations.

The second embodiment will now be described taking the arrangement of FIG. 1 as an example.

First, a procedure will now be described in which the image of an original placed on the platen of a reader of any one station is outputted from a plurality of printers using the concatenated system.

In the description that follows, it is assumed that four stations A, B, C, D shown in FIG. 1 are connected to the concatenated system and that an original has been placed on the platen of the reader at station A.

First, the reader control panel at station A is operated to verify that the stations B, C, D are operating normally and scan be used. After the verification is made, a setting is made to output data of the original on the reader platen of station A using all of the stations A, B, C, D, and the number of copies is set as well. When a copy starting key at station A is pressed, this station distributes the set copy number to each of the stations and sends the print-start command to all stations.

The print-start command indicates which station is used to transfer the image and how to distribute the copy number to each station used and causes the stations used to prepare for image acceptance. This command includes parameters which are not only the address of the source of image transfer, the request-destination address, paper size and number of copies but also the additional information to be set in the registers 2301~2308 of the add-on processing unit each station.

Upon receiving the print-start command, the stations B, C, D set the parameters such as the number of copies and paper size as well as the additional information sent together with this command, and perform a video-signal changeover based upon the system address of the source of the command and their own system addresses. These stations change over control for writing image data in their own image memories to VIDEO control lines (VCLK, HSYNC, VE) of the I/Fs and make a transition to a state in which they await an image signal.

Meanwhile, the station A performs a setting for reading the image and effects a changeover in such a manner that a control signal for writing image data in its own image memory emerges on the VIDEO control lines in the I/Fs and starts the image reading operation.

The stations B, C, D write image data in their image memories using the control signal obtained from the station A. When the image reading operation at station A is completed, the image transfer-end command is issued by the station A, and the station A and stations B, C, D each undergo a transition to a printout operation. As a result, the additional information is the same for all output images.

An original may similarly be placed on the reader platen of any of the stations A, B, C, D. Regardless of the station, outputs utilizing a plurality of the stations can be obtained through the same procedure by operating the control panel of the station having the original. However, when an image has been transferred from station B, the additional information of all output images is identical with that specific to station B. The same is true when images are transferred from stations C and D.

Similarly, when an output from a host computer connected, via an external I/F device such as an IPU, to one station connected to the concatenated system is printed out using a plurality of stations, the additional information is set by the print-start command issued by the station (station A in the present case) to which the IPU is connected, as a result of which the additional information is rendered the same for all output images.

Thus, in accordance with the second embodiment as described above, it is possible to specify, based upon the additional information of an output image, the reader used to output this image.

<Third Embodiment>

Figure 19:
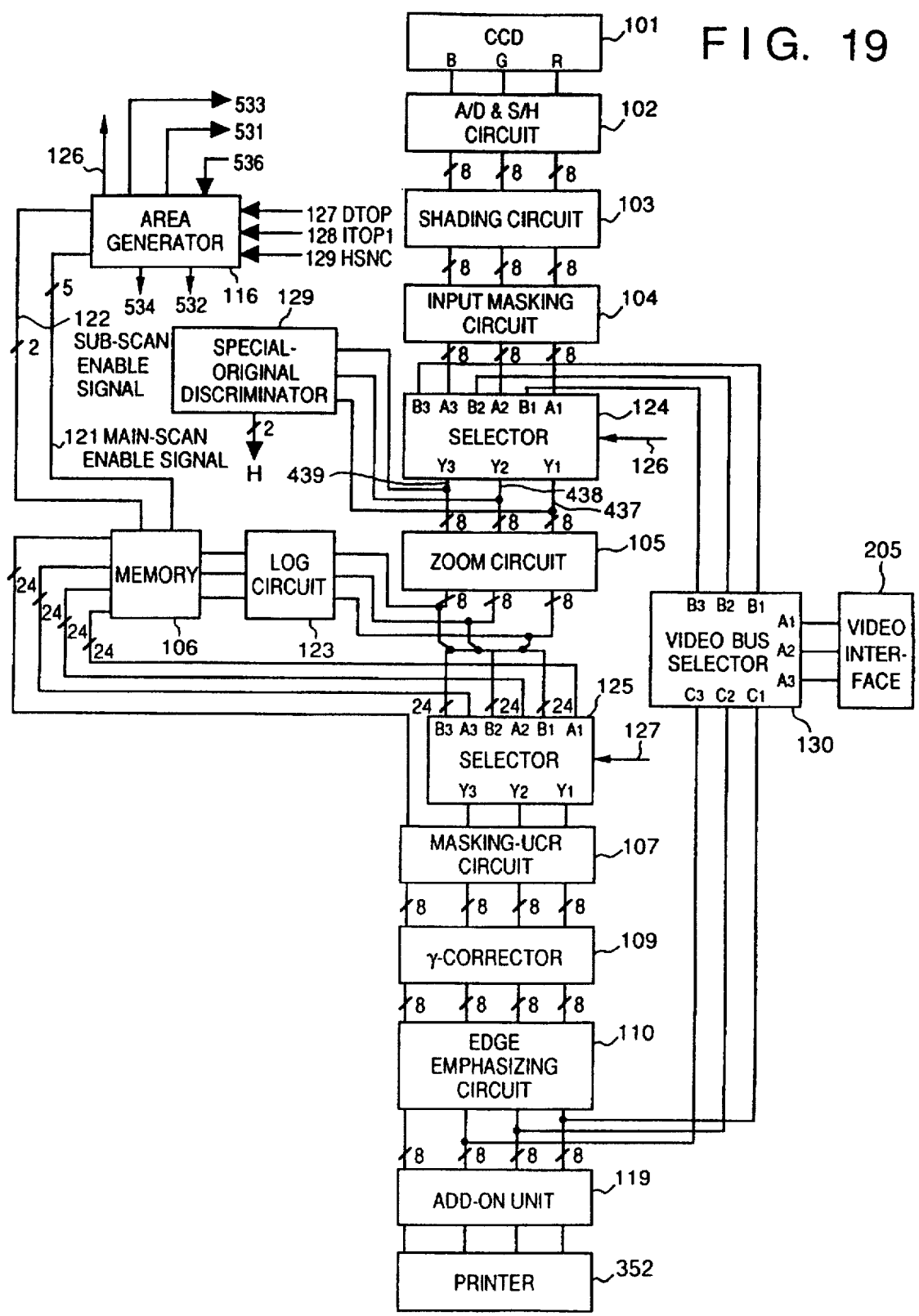
FIG. 19 is a block diagram showing a digital image processing section of a reader in a third embodiment of the present invention.

FIG. 19 is a block diagram showing a digital image processing section of a reader in a third embodiment of the present invention. The embodiment of FIG. 19 differs from that of FIG. 1 in the addition of a special-original discriminator 129. Since other components are identical with those shown in FIG. 1, they are designated by like reference characters and need not be described again.

(Special-original discriminating unit)

Figure 20:
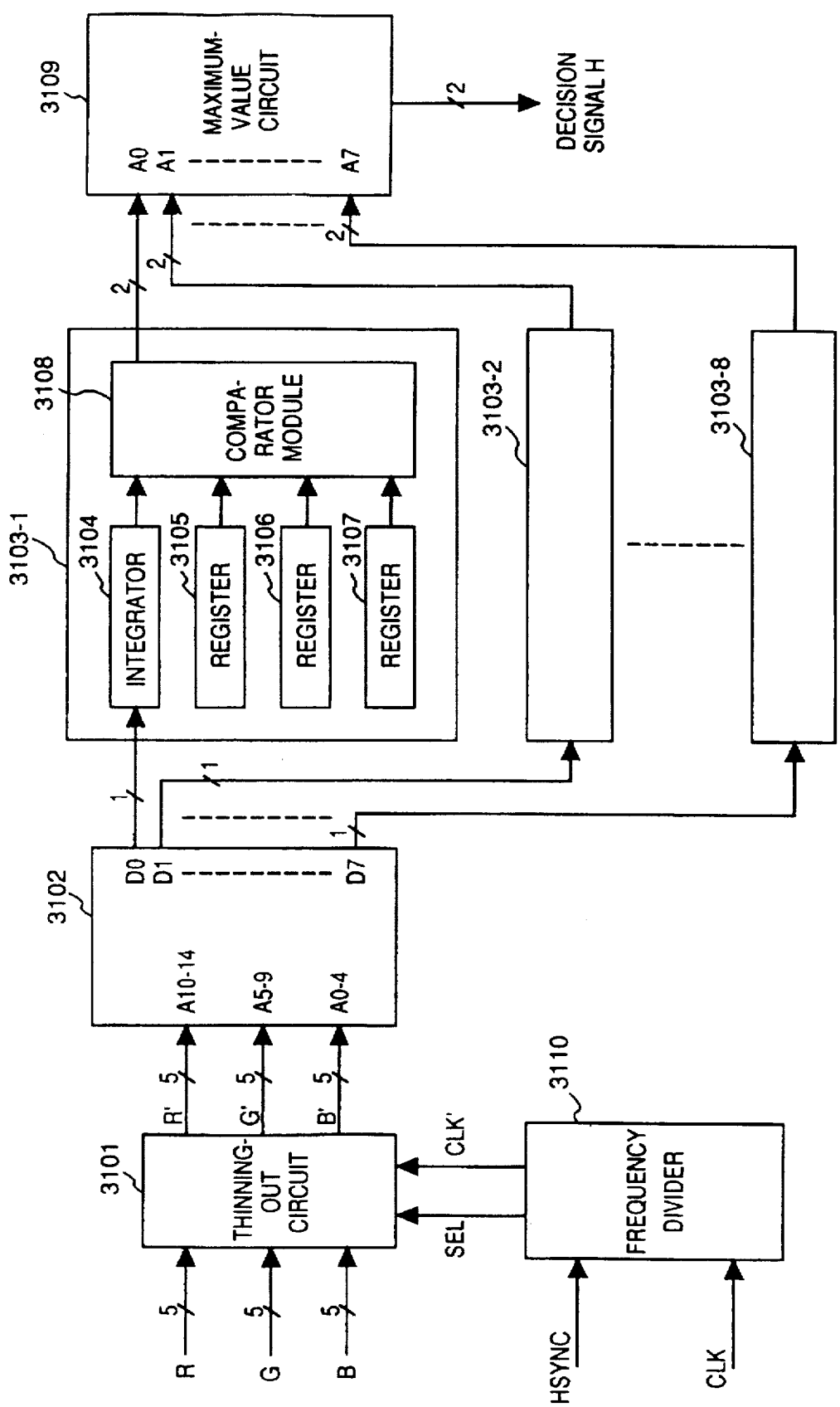
FIG. 20 is a block diagram showing the detailed construction of a special-original discriminator shown in FIG. 19.

FIG. 20 is a block diagram showing the special-original discriminator 129.

In FIG. 20, numeral 3101 denotes a thinning-out circuit, illustrated in FIGS. 22 and 23, which is described later. This circuit is for thinning out data in order to lighten the processing load on the processing circuitry of the special-original discriminator. Numeral 3102 denotes a color-matching look-up table (a read-only memory) for matching the colors of specific originals of a plurality of types. In the third embodiment, the distribution of the shades of colors of eight types of specific originals is investigated in advance, and it is determined whether the color shades of relevant pixels coincide with the color shades of the specific originals. The result of these judgments is stored in the look-up table 3102.

Numerals 3103-1, 3103-2, . . . , 3103-8 denote color-shade judging circuits, each of which is composed of identical hardware, namely an integrator 104, registers 3105, 3106, 3107 and a comparator module 3108. Each of these circuits Judges, in the form of two bits, the possibility that a specific original is contained in an original. Numeral 3109 designates a maximum-value circuit for outputting the maximum value among the results of judgment (output values) from the color-shade judging circuits 3103-1, 3103-2, . . . , 3103-8. That is, the maximum-value circuit 3109 delivers the result of judgment with regard to a specific original, from among eight types thereof, most likely to be present in the image of the original that has been read.

The special-original discriminator 129 judges the possibility that at least one of a plurality of special originals is in the process of being read in and outputs a decision signal H in the form of two bits of multiple values. More specifically, in a case where there is a very high possibility that at least one of a plurality of special originals is currently being read in, the output is H="3". If the possibility is very small, the output is H="0". The output H is accepted by a CPU (not shown), which is capable of judging whether the original being read in is a special original. For example, this original may be one which would lead to some problem or difficulty if it were copied.

Control according to the third embodiment having the construction set forth above will now be described with reference also to the timing chart of FIG. 21.

Figure 21:
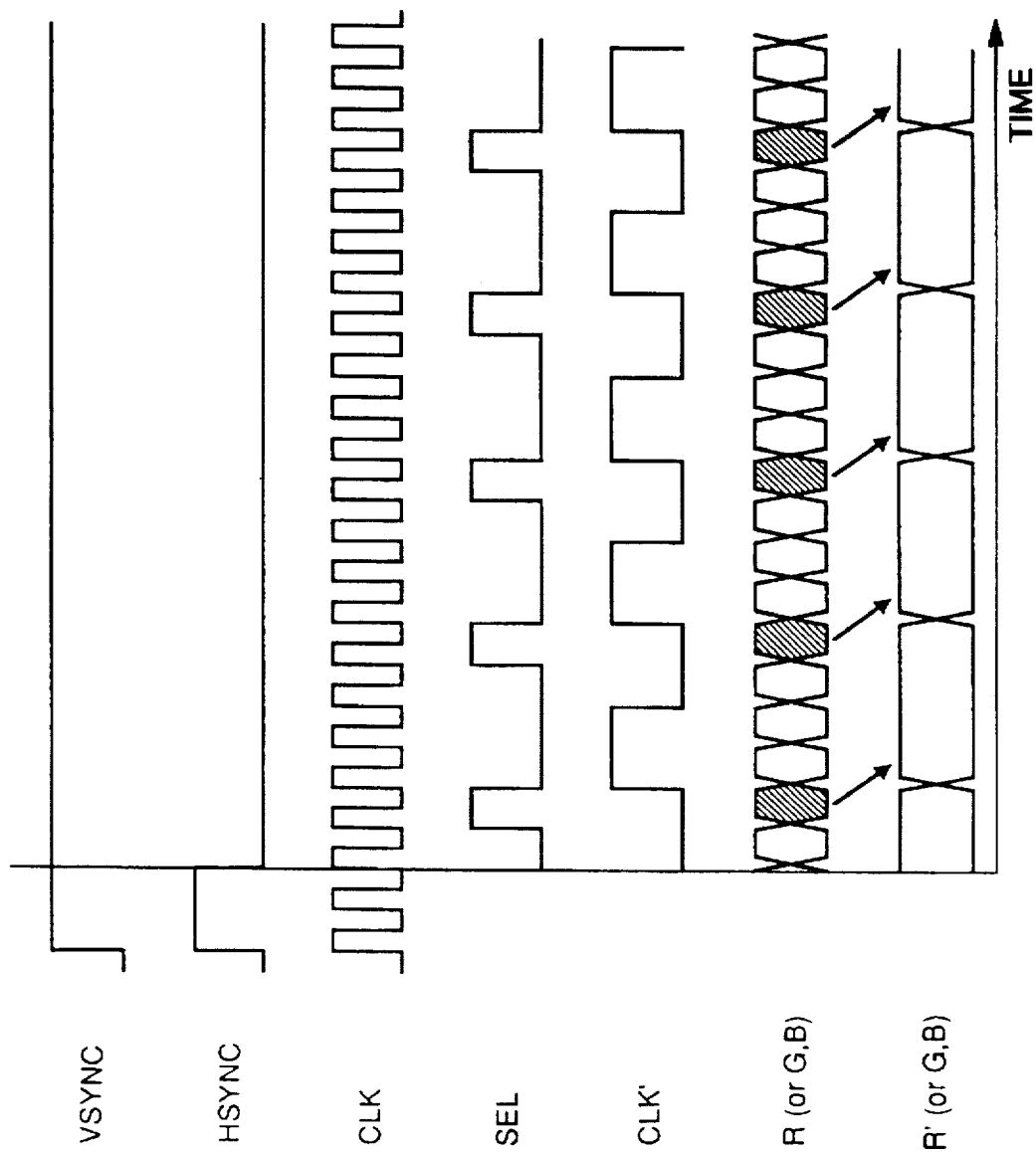
FIG. 21 is a diagram illustrating main-scan timing related to a special-original discriminator according to the third embodiment.

FIG. 21 is a timing chart of signals in the main-scanning direction according to the third embodiment.

In FIG. 21, VSYNC represents a sub-scan interval signal, namely a signal that indicates the output interval of a sub-scan signal, and HSYNC represents a main-scan synchronizing signal for achieving synchronization with the start of main scanning. A SEL signal is a timing signal used in the thinning-out circuit 3101. CLK is an image transfer clock which, in this embodiment, is the basic clock of image processing. CLK' represents a clock obtained by frequency division of the CLK signal by two. This serves as the basic clock in the special-original discriminator 129.

Figure 22:
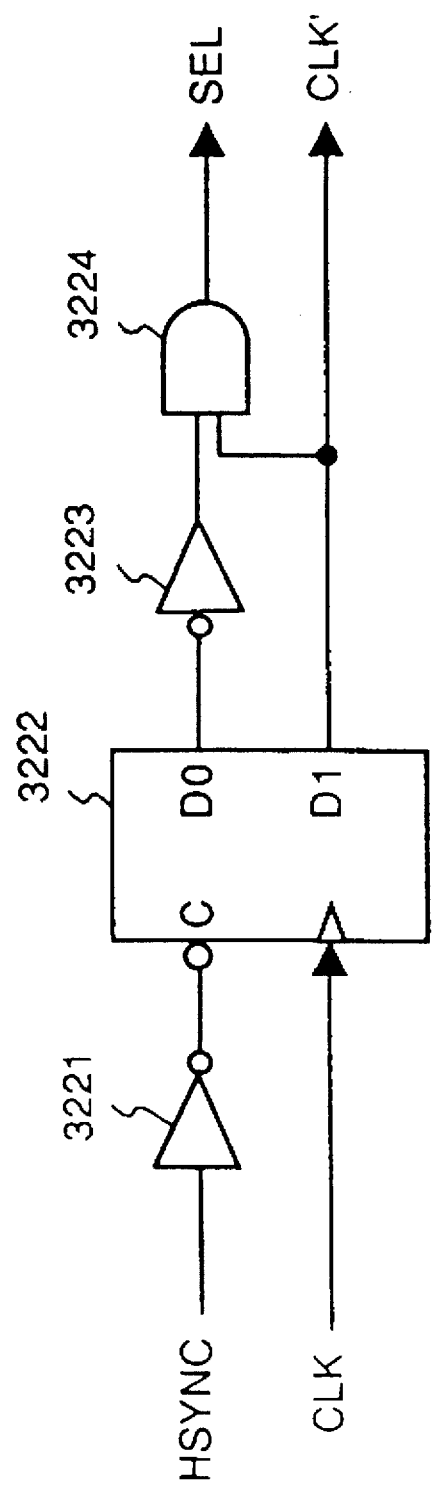
FIG. 22 is a block diagram illustrating the detailed construction of a frequency-divider circuit shown in FIG. 20.

The signals CLK' and SEL are produced by circuitry of the kind shown in FIG. 22. Specifically, the circuitry is constituted by an inverter 3221, a two-bit counter 3222, an inverter 3223 and an AND gate 3224. After being cleared (initialized) by the HSYNC signal, which is the main-scan synchronizing signal, the two-bit counter 3222 counts the CLK signal and outputs the counted value (D0, D1) in the form of two bits. The higher order bit D1 of the counter 3222 is outputted as the CLK' signal, and the result of taking the AND between this signal and a signal obtained by inverting the lower order bit D0 of the counter is outputted as the SEL signal.

Figure 23:
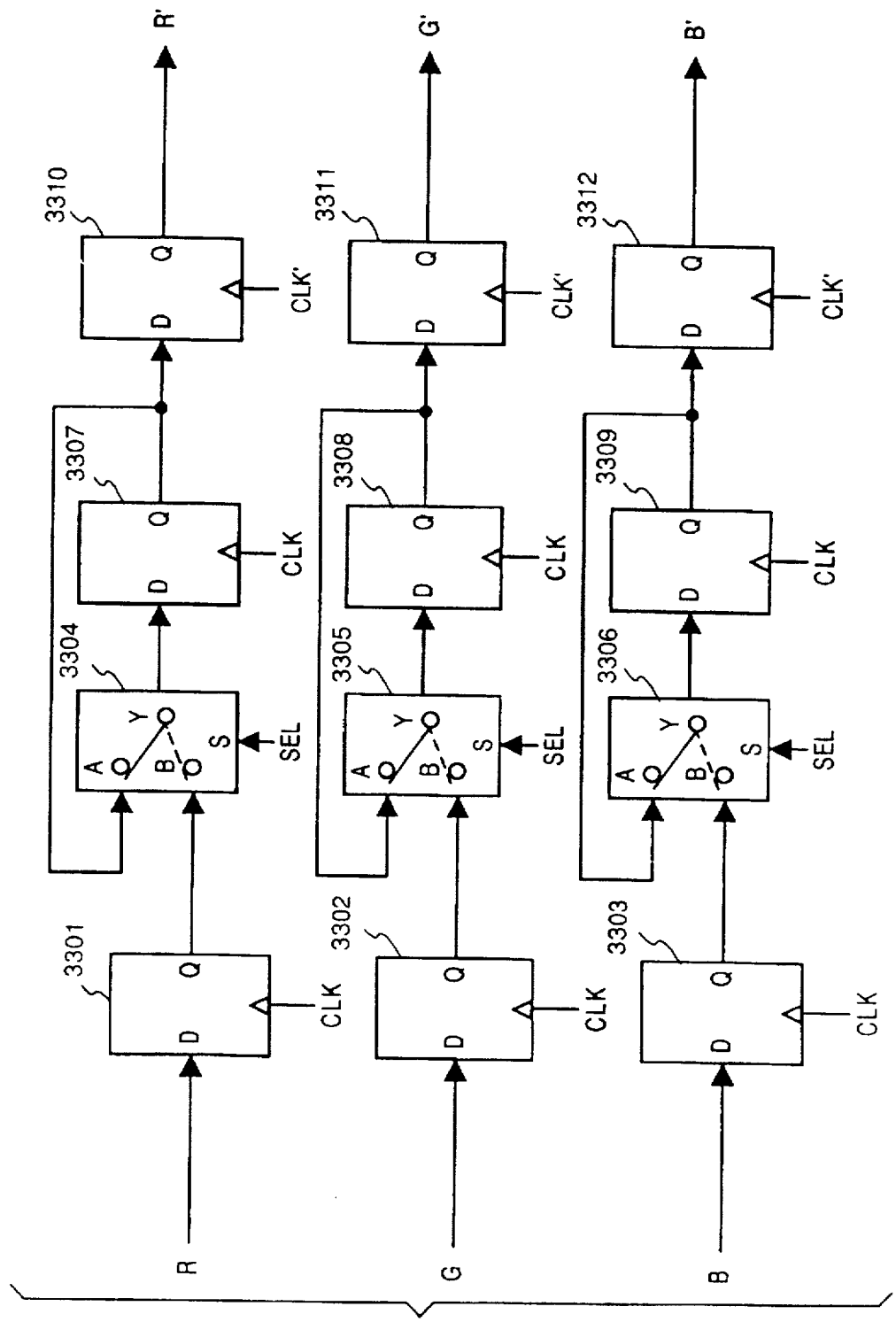
FIG. 23 is a block diagram illustrating the detailed construction of a thinning-out circuit shown in FIG. 20.

As a result, by virtue of the thinning-out circuit which, in FIG. 23, comprises flip-flops 3301, 3302, 3303 and 3307, 3308, 3309, which hold data in response to the CLK signal, selectors 3304, 3305 and 3306, and flip-flops 3310, 3311, 3312 that hold data by the CLK' signal, the R (or G, B) signal transferred by the CLK signal is thinned out at a ratio of 1/4, and an R' (or G', B') signal synchronized to CLK' can be obtained.

[Integrator]

Figure 24:
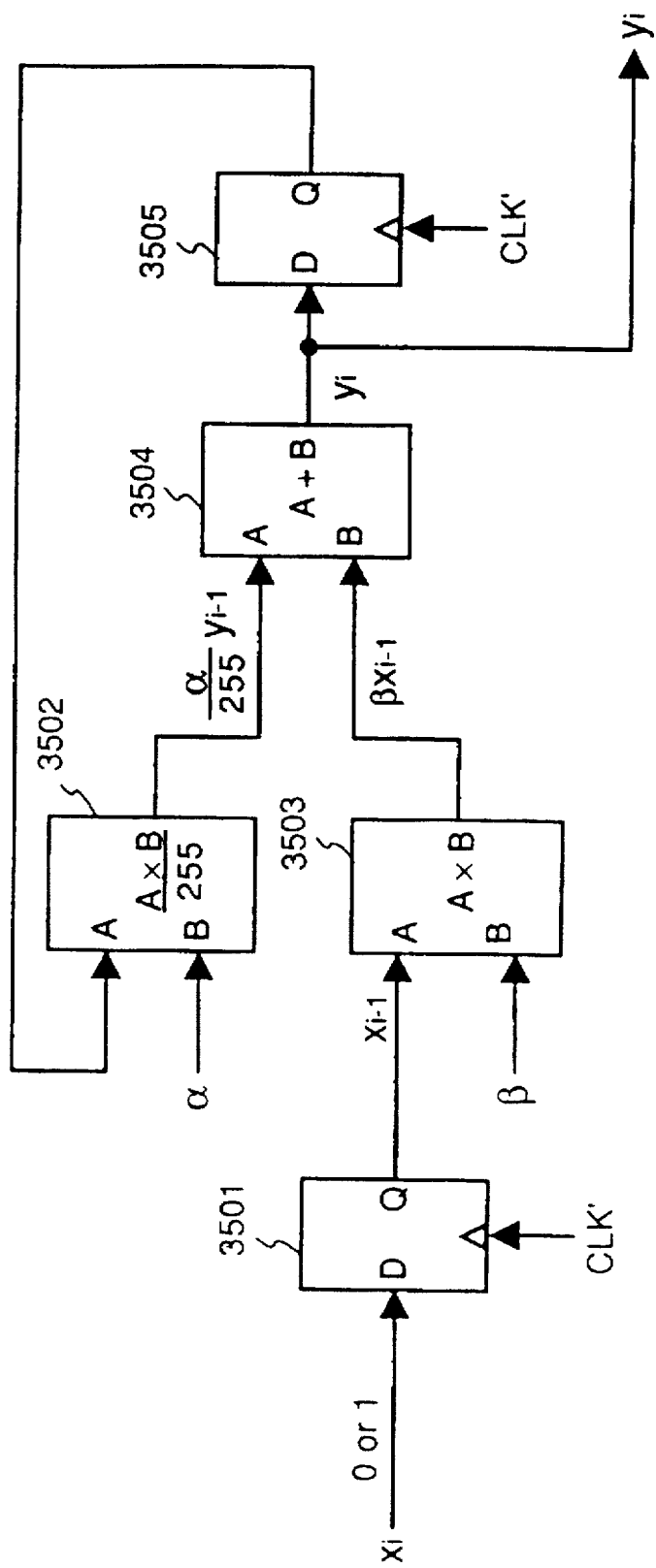
FIG. 24 is a block diagram illustrating the detailed construction of an integrator shown in FIG. 20.

FIG. 24 is a detailed block diagram showing the construction of the integrator 3104 illustrated in FIG. 20.

In FIG. 24, numerals 3501, 3505 denote flip-flops which hold data at the timing of the leading edge of the CLK' signal. Numeral 3502 denotes a multiplier to which two eight-bit signals (A, B) are inputted. The multiplier 3502 multiplies these signals together and outputs an eight-bit signal (255/A×B) as the result. Numeral 3503 denotes a multiplier to which a one-bit input signal (A) and an eight-bit input signal (B) are applied. The multiplier 3503 multiplies these signals together and outputs an eight-bit signal (A×B) as the result. Numeral 3504 denotes an adder to which two eight-bit signals (A, B) are inputted. The adder 3504 adds these signals together and outputs an eight-bit signal (A+B) as the result.

Figure 25A:
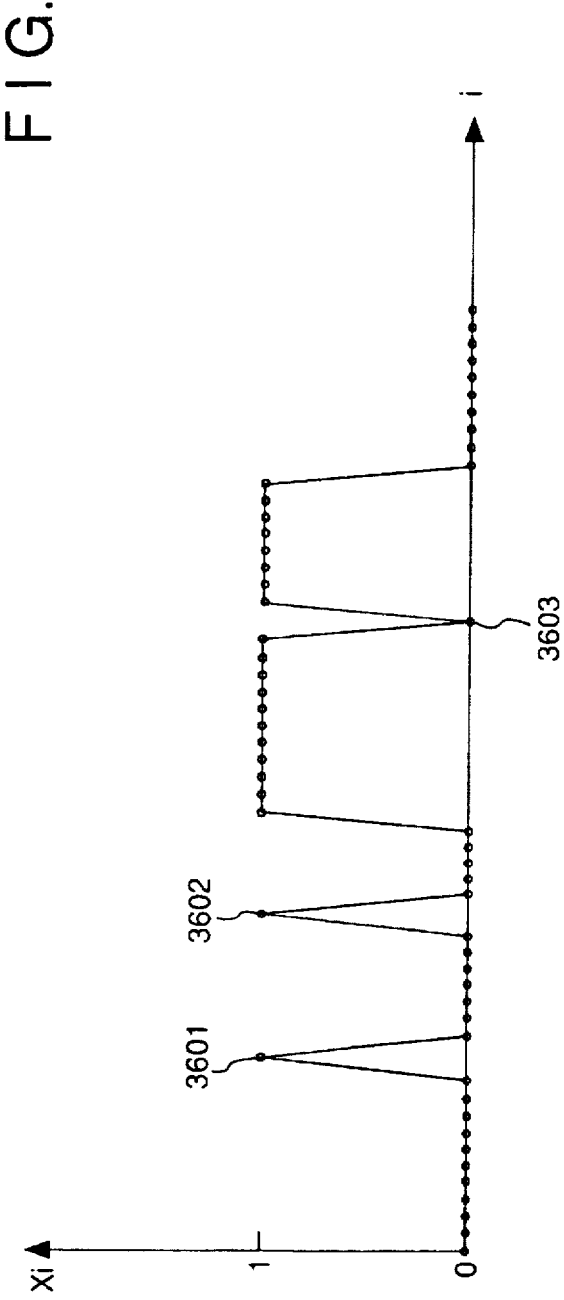
FIGS. 25A, 25B are conceptual views showing an example of an input and an example of an output of the integrator shown in FIG. 24.
Figure 25B:
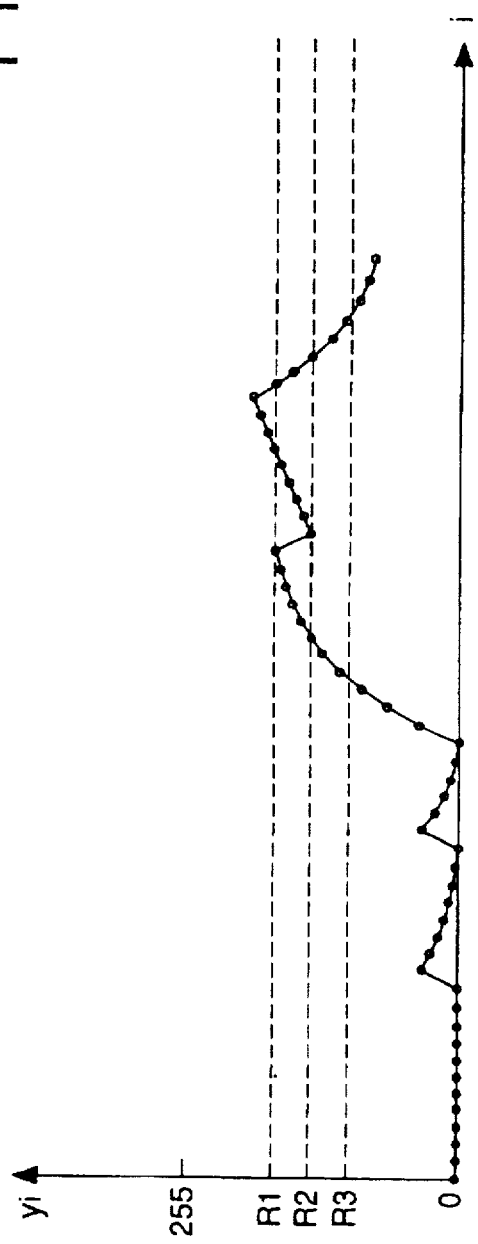

In the integrator of this embodiment constructed as set forth above, an eight-bit output signal $y_i$ is expressed by the following equation when a two-valued input signal $x_1$ is applied thereto:

$$y_i = (\alpha/255) \cdot y_{i-1} + \beta x_{i-1} \quad (1)$$

where $\alpha$ and $\beta$ represent constants that have been set in advance. The various characteristics of the integrator are determined by the sizes of these values. For example, FIGS. 25A, 25B illustrate an example of inputs and outputs of the integrator in a case where $\alpha=247$, $\beta=8$ holds. Specifically, an output $y_i$ of the kind shown in FIG. 25B is produced in response to an input $x_{i-1}$ of the kind shown in FIG. 25A.

An input "1" regardless of the fact that almost all values on either side thereof are "0", as at points 3601, 3602, and an input "0" regardless of the fact that almost all values on either side thereof are "1", as at point 3603, may be considered to be noise. This is processed by the integrator. Specifically, appropriate threshold values such as R1, R2, R3 are set respectively in the registers 3105, 3106, 3107 of FIG. 20, and the output $y_i$ of the integrator is binarized based upon these threshold values, whereby the noise can be removed.

[Comparator Module]

Figure 26:
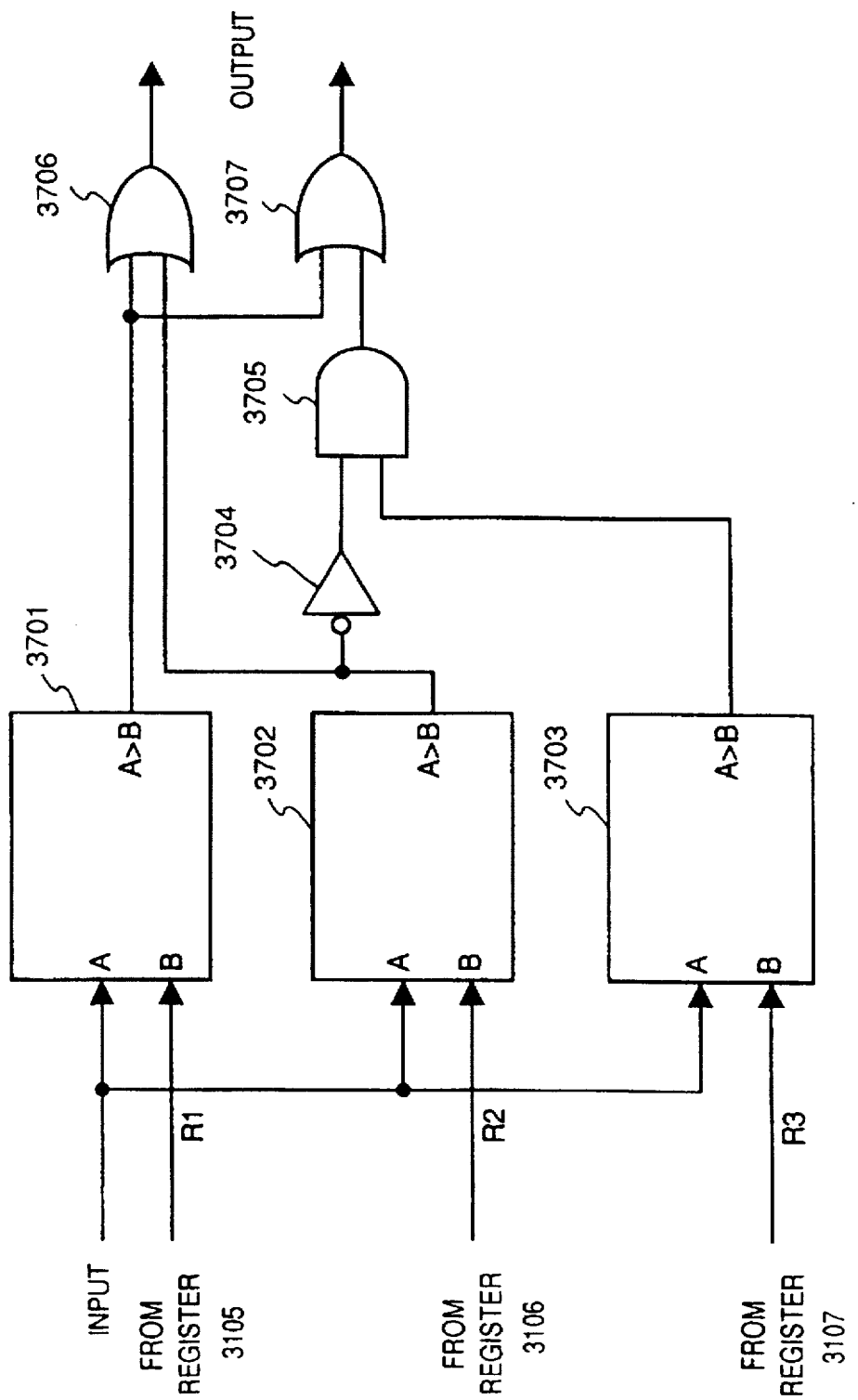
FIG. 26 is a block diagram illustrating the detailed construction of a comparator module shown in FIG. 20.

FIG. 26 is a detailed block diagram showing the construction of the comparator module 3108 illustrated in FIG. 20. In FIG. 26, 3701, 3702, 3703 denote comparators, 3704 an inverter, 3705 an AND gate, and 3706, 3707 OR gates. The threshold value R1 is preset in the register 3105, the threshold value R2 in the register 3106 and the threshold value R3 in the register 3107. These values are related as follows: R1>R2>R3.

By virtue of this arrangement, the decision rendered is quantized to two bits and outputted. More specifically, "11", "10", "01" and "00" are outputted when the following hold: R1<(input), R2<(input)≦R1, R3<(input)≦R2 and (input)≦R3, respectively.

The system is controlled by a CPU (not shown) in dependence upon the results of judgment. In a case where the output is "11" in this embodiment, the reader of the master station ceases the reading operation at this time and resets the system. Operation is carried out as usual if the output is other than "11".

In a case where a special original that would lead to difficulties if copied inadvertently has been read in, performing control in the manner described above makes it possible to halt subsequent processing and effectively prevent copying of the original.

<Fourth Embodiment>

The present invention is not limited to the first, second and third embodiments described above. For example, in the first embodiment, the manufacturing number specific to the device or the coded form of the manufacturing number is added on as the specific pattern. However, any information will suffice so long as it specifies the device. Examples of such information for specifying the device include date of manufacture of the device, the lot number and the version number thereof.

<Fifth Embodiment>

In the first, second, third and fourth embodiments mentioned above, the copying machine that produced the copy is specified. However, this does not place a limitation upon the invention, for the person making the copy may be specified if desired.

For example, devices already well known include those which require insertion of an ID card for specifying the user, and those requiring entry of an ID number, in order for the machine to be used. In devices of this kind, the recognized ID number or the coded form thereof may be added as the specific pattern.

Further, the date on which the copy was made or the coded version of this date may be added on as the specific pattern.

<Sixth Embodiment>

Figure 27:
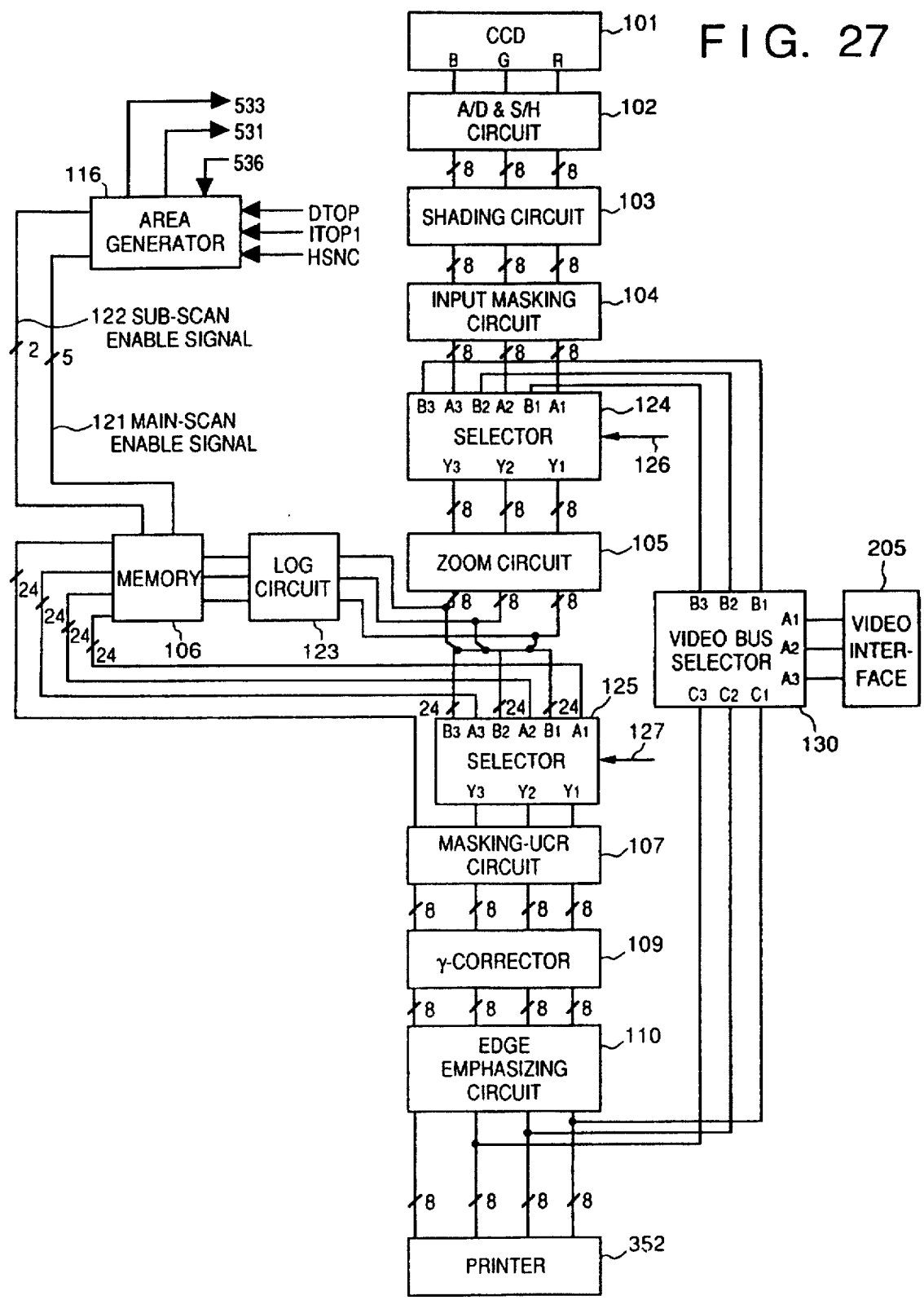
FIG. 27 is a block diagram showing a digital image processing section in an image forming device according to a sixth embodiment of the present invention.

The foregoing description takes as an example a case in which a device outputting a specific image can be specified mainly by using the add-on unit 119 with which it is equipped. However, the present invention is not limited to this example. In a case where there is no need for it, the add-on unit 119 may be eliminated. This will still allow the desired output to be obtained from a plurality of image forming devices. FIG. 27 illustrates an example of the construction of a sixth embodiment according to the invention, in which the add-on unit 119 is eliminated from the circuitry.

As shown in FIG. 27, the arrangement is similar to that of the first embodiment shown in FIG. 7 with the exception of the fact that the add-on unit 119 has been deleted. The total construction and operation of the sixth embodiment are identical with those of the first embodiment except for the fact that the add-on unit 119 and its operation have been deleted. Accordingly, the construction and operation need not be described again.

<Seventh Embodiment>

In each of the foregoing embodiments, each image forming device is internally provided with the memory 106 and a read image or output image is stored in the memory 106. However, the speed-up of recent image forming devices such as digital copiers has been accompanied by a greater need for memory having a larger storage capacity. Further, in image forming systems composed of a plurality of image forming devices, greater versatility can be obtained if this memory is capable of being shared by each image forming device. In such case, moreover, an extendible image forming system can be obtained in which it is possible to change the number of system components in dependence upon the necessary CV.

On the other hand, there is still great demand for the ability to output not only a reflective original but also images of a wide variety of kinds [(e.g., computer graphics (CG)]. Such a function is essential in modern digital computers. In this case also, if a CG image is capable of being outputted by each image forming device, this can be achieved through a simple arrangement.

A seventh embodiment of the present invention will now be described in which, in view of these circumstances, one image forming device constituting the system is provided not only with the foregoing arrangement but also with an image memory unit capable of being accessed from other image forming devices connected to the system.

In the description that follows, it is described that the image memory unit is constructed entirely separate from the internal memory 106. However, this does not impose a limitation upon the invention; it is obvious that the memory 106 of the specific image forming device may be constructed so as to be accessible from an external device.

The image memory unit of this embodiment is connected to the IPU interface 201, which is for interfacing the IPU 1108 illustrated in the detailed construction (see FIG. 18) of the I/F units 1101~1104 of each station shown in FIG. 2 in the first embodiment described above. The exchange of signals between the IPU interface 201 and each interface is carried out in accordance with the control described in the transfer mode of the first embodiment.

Figure 28:
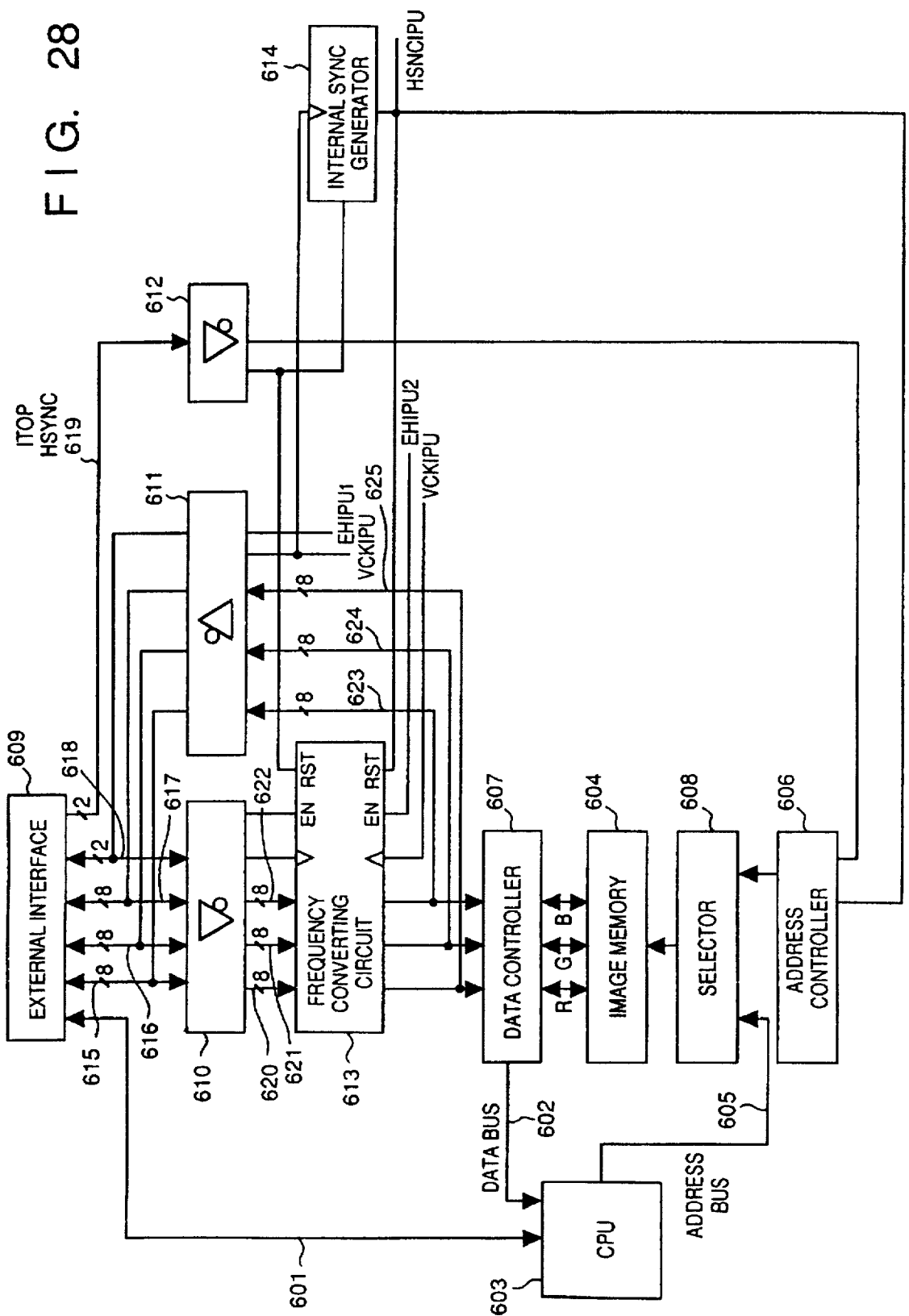
FIG. 28 is a block diagram showing the details of an image memory unit (IPU) according to a seventh embodiment of the present invention.

FIG. 28 is a detailed block diagram showing the image memory unit of the seventh embodiment of the invention connected to the IPU interface 201 illustrated in FIG. 18.

The image memory unit depicted in FIG. 28 accepts, under the control of a CPU 603, an image signal and a control signal from the outside (another device or the computer 1009, etc.) or from another component (the reader 351, etc.) within the device itself. The signals are accepted via an external interface 609 connected to the IPU interface 201 of FIG. 18. Synchronism between an external image clock and an image clock within the memory unit is achieved by a frequency converting circuit 613, and the image is stored in an image memory 604 via an address controller 606 and a data controller 607. In a case where the external device is a computer, signals are accepted directly by the CPU 603, as described below, and the image memory 604 is directly accessed via an address bus and data bus.

Also, in a case where image data that has been stored in the image memory 604 is read out, synchronism with the external device (e.g., reader 351, etc.) is achieved and the data that has been stored in the image memory is read out.

In FIG. 28, the image memory 604 has a capacity of a total of 24 bits for RGB with regard to one pixel. Control of control signals when the image memory 604 is accessed is performed in accordance with a signal produced by the address controller 606 based upon an external sub-scan synchronizing signal (corresponding to the aforementioned ITOP) (one bit in a signal 619) or internal main-scan synchronizing signal HSYNCIPU, etc., or in accordance with a signal from an address bus from the CPU 603 (one or the other of these is selected by a selector 608).

A frequency converting circuit 613 is for coordinating the timings of the image memory 604 and the external device, with is connected via the external interface 609. Here a FIFO buffer is used as the frequency converting circuit 613. The frequency converting circuit 613 is provided with an external clock (corresponding to the aforementioned VCLK) (one bit on signal line 618) as a write clock signal, an external main-scan synchronizing signal (one bit on signal line 619) as a write-reset signal, an enable signal (one bit on signal line 618), which is synchronized to the external main-scan synchronizing signal, as a write-enable signal, an internal clock (VCKIPU) as a readout clock signal, an internal main-scan synchronizing signal (HSYNCIPU) produced by an internal SYNC generator 614, based on the external main-scan synchronizing signal and the VCK IPU, as a readout-reset signal, and a readout-enable signal IENIPU2), generated by an area-enable generator (not shown) based upon the internal main-scan synchronizing signal and internal clock. These signals serve as control signals.

By writing data to and reading data from the FIFO buffer in accordance with these control signals, synchronism is established between the external image clock and the image clock within the memory unit.

Further, the internal SYNC generator 614 generates the internal main-scan synchronizing signal (HSYNCIPU) based upon the external main-scan synchronizing signal and internal clock signal VCKIPU from the tri-state buffer 612.

The construction and operation of the image memory unit of the seventh embodiment illustrated in FIG. 28 will now be described in detail function by function.

(Image memory write function)

Described first will be control for writing image data in the image memory 604 in a case where the external device is the reader 351 or another image forming device, etc., but not a computer.

In this case also the R, G, B image signals (eight bits each) that enter from the external interface 609 set to the input mode are sent to a frequency converting circuit 613 via a tri-state buffer 610 and 620~622. At this time the selector 608 is controlled by the CPU 603 so as to output the signal from the address controller 606 to the image memory 604 in such a manner that the tri-state buffers 610 and 612 are enabled and a tri-state buffer 611 is disabled.

The frequency converting circuit 613 in synchronized to the image clock within the memory unit in accordance with the main-scan synchronizing signal from the external device, such as the reader 351, and output signals 623–625 from the frequency converting circuit 613 are written in the image memory 604 via the data controller 607.

Meanwhile, an address signal, which is generated by the address controller 605 based upon the external sub-scan synchronizing signal (one bit within 619) and the internal main-scan synchronizing signal HSYNCIPU, etc., and control signals enter the image memory 604. Image data sent in via the external interface 609 is successively stored in the image memory 604 in accordance with these signals.

As described above, input data can be written in the image memory 604 based upon the external sub-scan enable signal (one bit within 619) and internal main-scan synchronizing signal HSYNCIPU. This means that if the device is connected to a system capable of outputting this signal, then data can be written in from any device of any construction in accordance with the control described above in connection with FIG. 18.

Next, writing of image data in the image memory 604 will be described for a case in which the external device is a computer.

Image data such as GPIB is sent in from a computer. Accordingly, the image data sent in as GPIB or the like is temporarily accumulated in a memory (not shown) within the CPU 603 via the external interface 609 and signal line 601. The CPU 603 thereafter controls the data controller 607 and selector 608 in such a manner that the data on address bus 605 and data bus 602 is supplied to the image memory 604. Image data from the computer is written directly in the image memory 604 via the address bus 605 and data bus 602. The image transfer at this time may make use of a DMA.

Thus, as described above, the computer 1008 is capable of writing any CG data or the like in the image memory 604.

(Output of image data to external device)

Described next will be control for transferring image data, which has been stored in the image memory 604 by the above-described control, to an external device. In this case, the CPU 603 performs control so as to disable ENIPU2, enable tri-state buffers 611, 612 and disable the tri-state buffer 610.

Address control at read-out of data stored in the image memory 604 will now be described.

In a case where image data is read out of another device connected to the system or out of another component within the device itself, the main-scan synchronizing signal and sub-scan synchronizing signal from the external device sent in via the external interface 609 are accepted and delivered to the address controller 606 via the tri-state buffer 612. For example, in a case where the reader 351 reads out the image data, the main-scan synchronizing signal and sub-scan synchronizing signal sent in via the external interface of the reader 351 are accepted by the external interface 609 and delivered to the address controller 606 via the tri-state buffer 612.

The address controller 606 successively increments the readout address signal and supplies it to the image memory 604 in synchronism with the main-scan synchronizing signal HSNC IPU produced by the internal SYNC generator 614 and sub-scan synchronizing signal sent in from the outside. The image data read out of the image memory 604 in accordance with this address signal is sent to the external interface 609 via the data controller 607 and tri-state buffer 611. The image data is then transferred from the external interface 609 to the external device via the IPU interface 201 shown in FIG. 18 and each of the other interfaces. For example, the image data is accepted by the reader 351 via the video interface 205.

If, say, another station reads image data out of the image memory 604 in this case, the control signal for the read-out operation and the image data read out can be sent successively to other devices connected to the system. As a result, the image data read out is capable of being accepted not only by the device that produced the control signal but also simultaneously by all of the devices connected to the system. In particular, in a case where the main-scan and sub-scan speeds are the same, image data can be accepted while synchronization is readily established among the devices.

Thus, the reader 351 of each device accepts the image data from the image memory 604 via the respective video interface so that this data can be stored in the memory 106. Prescribed processing such as printout by the printer 352 can be executed.

In accordance with the seventh embodiment as described above, each device connected to the system uses the main-scan synchronizing signal of the kind described above. As a result, when a system is constructed in which an external image memory unit is connected in image forming devices having the same process speed, resolution and pixel clock, the image memory unit illustrated in FIG. 28 is connected to one image forming device, whereby transfer of image data to the memories in a plurality of image forming devices connected to the system is capable of being realized by simpler hardware and control. Furthermore, if the arrangement is such that the memories in the image forming devices are capable of being read/write simultaneously, then writing/reading can be performed at the same time using the main-scan synchronizing signal of the reader 351 of each device (or, more specifically, the main-scan synchronizing signal of the printer 352 which actually processes the image data). As a result, a higher copying speed is attained.

<Eighth Embodiment>

Figure 29:
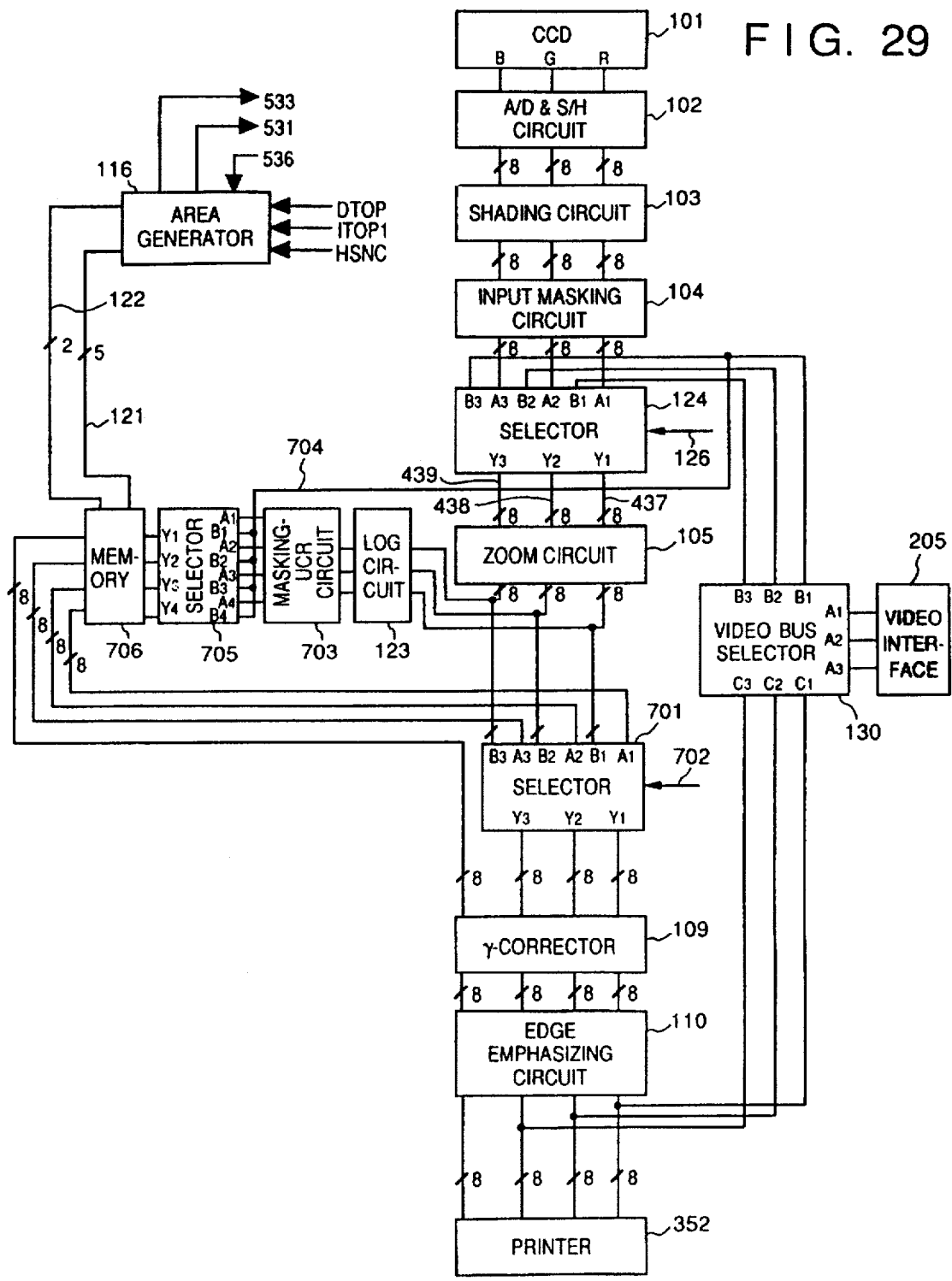
FIG. 29 is a block diagram showing the construction of a digital image processing section in an eighth embodiment of the present invention.

FIG. 29 is a block diagram showing the construction of a digital image processing section in an eighth embodiment of the present invention. This embodiment is adapted so that YMCK serial data can be written in an internal memory. Components in FIG. 29 identical with those shown in FIGS. 7 and 27 set forth above are designated by like reference characters and need not be described again.

Unlike the arrangement of FIG. 27, in which the LOG circuit 123 and memory 106 of FIG. 27 are directly interconnected and the masking-UCR circuit 703 is placed between the selector 125, whose inputs and outputs are 24 bits, and the γ-corrector circuit 109, here a masking-UCR circuit 703 is connected to the output of the LOG circuit 123, a selector 705 is connected to the output of the circuit 703, and a memory 706 is connected to the selector 705. In addition, the selector 125 is replaced by a selector 701 whose inputs and outputs are eight bits, the output of the memory 706 is connected to the selector 701, and the output side of the selector 701 is connected directly to the γ-corrector circuit 109.

The construction of the eighth embodiment will now be described in detail.

(1) Since the storage of data in the memory 706 is performed in the form YMCK, the masking-UCR circuit 703 is placed on the input side of the selector 706.

(2) In the example of FIG. 27, the selector 125 that changes over each item of input data at the time of output to an external device and at the time of normal operation has inputs and outputs which are 24 bits each.

In the selector 701 of FIG. 29, however, the inputs and outputs are eight bits each. It should be noted, however, that the control method of control signal 127 in selector 125 and the control method of control signal 702 in selector 701 are identical.

(3) The selector 705 is additionally provided. The latter changes over between an external signal and a signal from a reflective original. The control method of selector 705 is such that when it is desired to store an external signal from the video interface 205 in the memory 706 as YMCK-serial data, the control signal is made "1" (the high level) to select and output the B input. At other times the control signal is made "0" (the low level) to select and output the A input. The control signal is set by the CPU (not shown).

(4) The writing of the memory 706 can be controlled color by color. That is, it is possible to write in a YMCK serial.

These four points characterize the eighth embodiment. In other aspects this embodiment is similar to the embodiments described above.

By adopting the arrangement described above, storage of data in the memory 706 can be performed in the form YMCK and the inputs/outputs of the selectors are only eight bits each. The result is a simpler construction. Moreover, it is possible to store image data in the image memory 604 in the form of a YMCK serial input.

Figure 30:
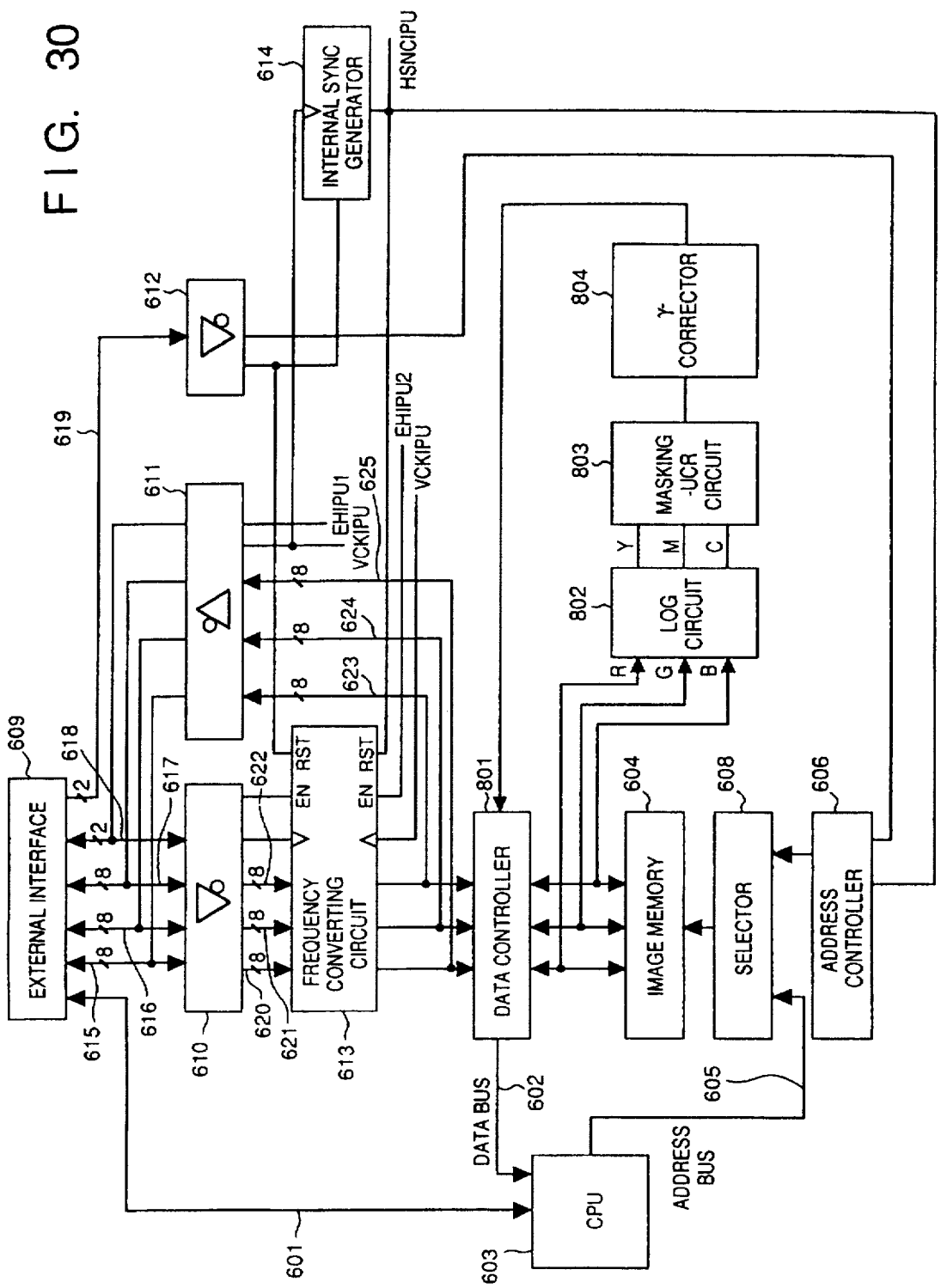
FIG. 30 is a block diagram showing the details of an image memory unit (IPU) according to an eighth embodiment of the present invention.

FIG. 30 is a block diagram illustrating the construction of the image memory unit (IPU) in a case where the digital image processing section is constructed as shown in FIG. 29.

Components in FIG. 30 identical with those shown in FIG. 28 of the seventh embodiment are designated by like reference characters and need not be described again.

The eighth embodiment shown in FIG. 30 differs from the embodiment of FIG. 28 in that a CMYK serial output is capable of being arranged as the image data. More specifically, the output of the image memory 604 is provided with a LOG circuit 802, a masking-UCR circuit 803 (outputs frame-sequential YMCBk signal in this embodiments) and a γ-corrector circuit 804. These are connected between the output of the image memory 604 and a data controller 801.

Furthermore, the output of the γ-corrector circuit 804 enters the data controller 801. The signal is capable of being transferred from the external interface 609 to the external device through signal lines 623, 615.

When it is attempted to obtain an MCYK serial output, for example, the device to which the image memory unit shown in FIG. 30 is connected transmits a total of four sub-scan readout-enable signals. The address controller 606 reads the stored data out of the image memory 604 each time a sub-scan readout-enable signal arrives, and the LOG circuit 802, masking-UCR circuit 803 and γ-corrector circuit 804 serially output the M data, C data, Y data and K data to the data controller 801 each time a sub-scan readout-enable signal arrives. This data is transferred from the external interface 609 to the external device through signal lines 623, 615.

By virtue of this arrangement, MCYK serial data can be transferred successively to other connected devices via the external interface 609, and each device (station) connected to the system, which device has received the transferred data, is capable of writing in the data simultaneously.

In the eighth embodiment constructed as set forth above, each device connected to the system writes data in the image memory unit, and reads data out of the image memory unit, using the same main-scan synchronizing signal. As a result, when a system is constructed in which an external image memory unit is connected in image forming devices having the same process speed, resolution and pixel clock, transfer of image data from the external image memory unit to the memories in a plurality of image forming devices is capable of being realized by simpler hardware and control.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the embodiments described above, additional data is set in appropriate fashion so that an image forming device that outputted or copied an output image can be specified correctly from the output image.

In accordance with another embodiment, an image memory unit can be connected to a desired device and data read out of the image memory can be read in by connected devices by using a synchronizing signal from another device. In image forming devices having the same process speed, resolution and image clock, transfer of image data from the external image memory unit to the memories in a plurality of image forming devices is capable of being achieved using simpler hardware and control.

As many apparently widely different embodiments of the present invention can be made without departing from the spirit and scope thereof, it is to be understood that the invention is not limited to the specific embodiments thereof except as defined in the appended claims.

What is claimed is:

1. An image forming system composed of a plurality of interconnected image forming devices each of which has storing means for storing an image signal, said system comprising:

image input means for entering an image signal;

image processing means for processing the image signal entered by said image input means;

transfer means for transferring the image signal, which has been processed by said image processing means, to the plurality of image forming devices simultaneously; and additional information superimposing means for superimposing additional information on the transferred image signal, wherein additional information which differs for each image forming device is added on to output images obtained from the plurality of image forming devices.

2. An image forming system composed of a plurality of interconnected image forming devices each of which has storing means for storing an image signal, said system comprising:

image input means for entering an image signal;

image processing means for processing the image signal entered by said image input means;

transfer means for transferring the image signal which has been processed by said image processing means, to the plurality of image forming devices simultaneously; and additional-information superimposing means for superimposing additional information on the image signal processed by said image processing means, wherein additional information for each of the plurality of image forming devices comprise an identical format.

3. The system according to claim 1 or 2, wherein the additional information contains identifying information for identifying the device.

4. The system according to claim 1 or 2, wherein adding on of the additional information is performed solely in a least conspicuous color of a plurality of colors constituting the image signal.

5. The system according to claim 1 or 2, wherein said image input means includes image reading means for optically reading in, and converting to an electric signal, a color-separated color image signal in an image forming device.

6. The system according to claim 1 or 2, wherein each of said image forming devices further includes image coding means for obtaining coded data by coding an image signal, and image decoding means for obtaining an image signal by decoding the coded data.

7. The system according to claim 6, wherein each of said image forming devices includes image forming means for obtaining a full-color image output by successively transferring, in superimposed form, the decoded data to a medium in successive colors in a plurality of image forming units.

8. The system according to claim 1 or 2, wherein each image forming device further includes memory means for storing the image signal processed by said image processing means, the image signal stored in said memory means of a prescribed image forming device being outputted to another image forming device.

9. An image forming system in which a plurality of image forming devices are interconnected, each image forming device having image input means for entering an image signal, storage means for storing the image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;
at least one of the plurality of image forming devices having memory connecting means for connecting an image input unit, wherein data is transferred simultaneously from said image input unit connected by said memory connecting means to said storage means of the plurality of image forming devices connected to the system.

10. The system according to claim 9, wherein said plurality of image forming devices include an image forming device to which said image input unit has been connected.

11. The system according to claim 9, wherein data transfer from said image input unit connected by said memory connecting means to the storage means of the plurality of image forming devices is performed using an identical timing signal.

12. The system according to claim 11, wherein writing of transfer data to the storage means of said plurality of image forming devices is performed in accordance with a main-scan synchronizing signal and a sub-scan synchronizing signal of an image.

13. An image forming system in which a plurality of image forming devices are interconnected, each image forming device having image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;
at least one of the plurality of image forming devices constituting the system having memory connecting means for connecting an image input unit;
wherein writing of image data from said image input unit, which is connected by said memory connecting means, to the storage means of said plurality of image forming devices is performed in accordance with a main-scan synchronizing signal of said plurality of image forming devices and a sub-scan synchronizing signal for image forming.

14. The system according to claim 13, wherein an image clock of said plurality of image forming devices when image data is written from said image input unit to the storage means of said plurality of image forming devices is a signal generated within each image forming device.

15. The system according to claim 13, wherein said plurality of image forming devices each include frequency converting means at an input section to which inputs are applied from other image forming devices, data which has been frequency-converted by said frequency converting means entering as an input.

16. The system according to claim 13, wherein a write-clock period for writing data to the storage means within said plurality of image forming devices and a period of the main-scan synchronizing signal are identical.

17. The system according to claim 13, wherein a sub-scan enable signal of said image input unit and of the storage means within said plurality of image forming devices are identical.

18. An image forming system in which a plurality of image forming devices are interconnected for transferring image signals to one another, each image forming device having image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;
wherein a digital image signal read by reading means of an image forming device, which has been selected from among said plurality of image forming devices connected to the system, is written in the storage means of said plurality of image forming devices,
wherein writing of the digital image signal from the selected image forming device to the storage means of said plurality of image forming devices is performed in accordance with a main-scan synchronizing signal of said plurality of image forming devices and a sub-scan synchronizing signal for image forming.

19. An image forming system in which a plurality of image forming devices are interconnected for transferring image signals to one another, each image forming device having image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;
wherein a digital image signal read by reading means of an image forming device, which has been selected from among said plurality of image forming devices connected to the system, is written in the storage means of said plurality of image forming devices,
wherein an image clock of said plurality of image forming devices when image data is written from an image memory unit to the storage means of said plurality of image forming devices is a signal generated within each image forming device.

20. An image forming system in which a plurality of image forming devices are interconnected for transferring image signals to one another, each image forming device having image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein said plurality of image forming devices each include frequency converting means at an input section to which inputs are applied from other image forming devices, data which has been frequency-converted by said frequency converting means entering as an input.

21. An image forming system in which a plurality of image forming devices are interconnected for transferring image signals to one another, each image forming device having image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein a write-clock period for writing data to the storage means within said plurality of image forming devices and a period of a main-scan synchronizing signal are identical.

22. An image forming system in which a plurality of image forming devices are interconnected for transferring image signals to one another, each image forming device having image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein a main-scan signal when data is written to the storage means of said image forming devices and a main-scan signal when data is read out of said storage means use signals that are different from each other.

23. An image forming system in which a plurality of image forming devices are interconnected for transferring image signals to one another, each image forming device having image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein a main-scan signal when data is written to the storage means of said image forming devices and a main-scan signal when data is read out of said storage means use identical signals.

24. An image forming apparatus for an image forming system in which a plurality of image forming apparatuses are interconnected, comprising:

image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means and for inputting the image signal and the control signal from a second external unit, memory connecting means for connecting an image input unit, wherein data is transferred simultaneously from said image input unit connected by said memory connecting means to said storage means of the plurality of image forming devices connected to the system.

25. An image forming apparatus for an image forming system in which a plurality of image forming apparatuses are interconnected comprising:

image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means and for inputting the image signal and the control signal from a second external unit;

memory connecting means for connecting an image input unit;

wherein writing of image data from said image input unit, which is connected by said memory connecting means, to the storage means of said plurality of image forming devices is performed in accordance with a main-scan synchronizing signal of said plurality of image forming devices and a sub-scan synchronizing signal for image forming.

26. An image forming apparatus for an image forming system in which a plurality of image forming devices are interconnected for transferring image signals to one another, comprising:

image input means for entering an image signal, storage means for storing an image signal entered by said image input means, image forming for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein writing of the digital image signal from the selected image forming device to the storage means of said plurality of image forming devices is performed in accordance with a main-scan synchronizing signal of said plurality of image forming devices and a sub-scan synchronizing signal for image forming.

27. An image forming apparatus for an image forming system in which a plurality of image forming devices are interconnected for transferring image signals to one another, comprising:

image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein an image clock of said plurality of image forming devices when image data is written from said image memory unit to the storage means of said plurality of image forming devices is a signal generated within each image forming device.

28. An image forming apparatus for an image forming system in which a plurality of image forming devices are interconnected for transferring image signals to one another, comprising:

image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which as been selected from among said plurality of image forming devices connected to the system, is written in the storage means of said plurality of image forming devices, wherein said plurality of image forming devices each include frequency converting means at an input section to which inputs are applied from other image forming devices, data which has been frequency-converted by said frequency converting means entering as an input.

29. An image forming apparatus for an image forming system in which a plurality of image forming devices are interconnected for transferring image signals to one another, comprising:

image input means for entering in image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein a write-clock period for writing data to the storage means within said plurality of image forming devices and a period of a main-scan synchronizing signal are identical.

30. An image forming apparatus for an image forming system in which a plurality of image forming devices are interconnected for transferring image signals to one another, comprising:

image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein a main-scan signal when data is written to the storage means of said image forming devices and a main-scan signal when data is read out of said storage means use signals that are different from each other.

31. An image forming apparatus for an image forming system in which a plurality of image forming devices are interconnected for transferring image signals to one another, comprising:

image input means for entering an image signal, storage means for storing an image signal entered by said image input means, image forming means for forming an image on an output medium based upon the image signal stored in said storage means, and transfer means for outputting, to a first external unit, the image signal, and a control signal that controls said storage means for inputting the image signal and the control signal from a second external unit;

wherein a digital image signal read by reading means of an image forming device, which has been selected from among said plurality of image forming devices connected to the system, is written in the storage means of said plurality of image forming devices, wherein a main-scan signal when data is written to the storage means of said image-forming devices and a main-scan signal when data is read out of said storage means use identical signals.

32. An image forming system in which a plurality of image forming devices are interconnected in a concatenated system, with each image forming device comprising:

image input means for entering an image signal;

storage means for storing an image signal entered by said image input means;

image forming means for forming an image on an output medium based on the image signal stored in said storage means; and transfer means for outputting, to other image forming devices, an image signal and a control signal that controls said storage means to input the image signal, from an external unit or another one of the plurality of image forming devices;

wherein at least one of the plurality of image forming devices includes memory connecting means for connection to an image input unit which supplies an image signal, wherein the image signal from the image input unit connected to said memory connecting means is simultaneously transferred to said storage means of each of the plurality of image forming devices.

* * * * *

UNITED STATES PATENT AND TRADEMARK OFFICE
CERTIFICATE OF CORRECTION

PATENT NO. : 5,692,229

DATED : November 25, 1997

INVENTORS : KOICHI ISHIMOTO ET AL.

It is certified that error appears in the above-identified patent and that said Letters Patent is hereby corrected as shown below:

COLUMN 13 line 35, "[Results" should read --{Results--.

COLUMN 14 line 51, "addres" should read --address--.

COLUMN 15 line 17, "addres" should read --address--.

COLUMN 17 line 7, "WE;" should read --VVE;--.

COLUMN 18 line 25, "receiver (or transmitter)." should read --receivers (or transmitters).--; and line 60, "→signal line→" should read --→signal line 222→--.

COLUMN 19 line 61, →signal line→" should read --→signal line 234→--.

UNITED STATES PATENT AND TRADEMARK OFFICE
CERTIFICATE OF CORRECTION

PATENT NO. : 5,692,229

DATED : November 25, 1997

INVENTORS : KOICHI ISHIMOTO ET AL.

It is certified that error appears in the above-identified patent and that said Letters Patent is hereby corrected as shown below:

COLUMN 22 line 55,   "→signal line (HVE" should read --→signal line 238(HVE--.

COLUMN 25 line 40,   "scan" should read --can--; and
   line 54,   "unit" should read --unit at--.

COLUMN 26 line 59,   "Judges," should read --judges,--.

COLUMN 27 line 56,   "(255/AxB)" should read --(AxB/255)--.

COLUMN 28 line 33,   "Judgment." should read --judgement.--.

COLUMN 30 line 27,   "with" should read --which--; and
   line 40,   "IENIPU2)" should read --(ENIPU2),--.

UNITED STATES PATENT AND TRADEMARK OFFICE
CERTIFICATE OF CORRECTION

PATENT NO. : 5,692,229

DATED : November 25, 1997

INVENTORS : KOICHI ISHIMOTO ET AL.

It is certified that error appears in the above-identified patent and that said Letters Patent is hereby corrected as shown below:

COLUMN 31 line 1,   "in" should read --is--.

COLUMN 34 line 41,   "additional information" should read --additional-information--.

COLUMN 38 line 41,   "interconnected" should read --interconnected,--.

COLUMN 39 line 54,   "as" should read --has--.

UNITED STATES PATENT AND TRADEMARK OFFICE
CERTIFICATE OF CORRECTION

PATENT NO. : 5,692,229

DATED : November 25, 1997

INVENTORS : KOICHI ISHIMOTO ET AL.                    Page 4 of 4

It is certified that error appears in the above-identified patent and that said Letters Patent is hereby corrected as shown below:

<u>COLUMN 40</u> line 1, "in" should read --an--.

Signed and Sealed this

Eleventh Day of August 1998

Attest:

BRUCE LEHMAN

Attesting Officer        Commissioner of Patents and Trademarks